United States Patent
Cappaert et al.

(10) Patent No.: US 8,400,607 B2
(45) Date of Patent: Mar. 19, 2013

(54) DISPLAY ASSEMBLIES AND METHODS OF DISPLAY

(75) Inventors: Bart Cappaert, Tielt (BE); Jean-Marc Schroeyers, Bruges (BE)

(73) Assignee: Barco N.V., Kortrijk (BE)

( * ) Notice: Subject to any disclaimer, the term of this patent is extended or adjusted under 35 U.S.C. 154(b) by 1477 days.

(21) Appl. No.: 11/539,265

(22) Filed: Oct. 6, 2006

(65) Prior Publication Data

US 2007/0081344 A1 Apr. 12, 2007

Related U.S. Application Data

(60) Provisional application No. 60/724,787, filed on Oct. 11, 2005.

(51) Int. Cl.
*G02F 1/1333* (2006.01)
*G02F 1/1335* (2006.01)

(52) U.S. Cl. .......................... 349/161; 349/61

(58) Field of Classification Search .............. 349/161, 349/61; 362/294, 345, 373
See application file for complete search history.

(56) References Cited

U.S. PATENT DOCUMENTS

| | | | |
|---|---|---|---|
| 5,146,354 A | 9/1992 | Plesinger | |
| 5,299,038 A | 3/1994 | Hamada | |
| 5,313,234 A | 5/1994 | Edmonson | |
| 5,546,203 A | 8/1996 | Takao | |
| 5,682,216 A * | 10/1997 | Lin et al. | 349/122 |
| 5,742,366 A | 4/1998 | Imoto | |
| 5,748,269 A | 5/1998 | Harris | |
| 5,793,452 A * | 8/1998 | Miyawaki | 349/58 |
| 5,818,010 A | 10/1998 | McCann | |
| 5,991,153 A * | 11/1999 | Heady et al. | 361/704 |
| 6,089,751 A | 7/2000 | Conover | |
| 6,108,060 A | 8/2000 | Funamoto | |
| 6,181,070 B1 | 1/2001 | Dunn | |
| 6,428,198 B1 | 8/2002 | Saccomanno | |
| 6,493,440 B2 | 12/2002 | Gromatzky | |
| 6,522,543 B2 * | 2/2003 | Kurihara et al. | 361/704 |
| 6,655,825 B2 | 12/2003 | Muthu | |
| 6,693,682 B2 | 2/2004 | Fujishiro | |
| 6,825,828 B2 | 11/2004 | Burke | |
| 6,839,100 B1 | 1/2005 | Saito | |
| 6,885,412 B2 | 4/2005 | Ohnishi | |
| 7,059,757 B2 * | 6/2006 | Shimizu | 362/561 |
| 7,072,096 B2 * | 7/2006 | Holman et al. | 359/298 |
| 7,086,761 B2 | 8/2006 | Won | |
| 7,431,475 B2 * | 10/2008 | Hafuka et al. | 362/218 |
| 7,570,341 B2 * | 8/2009 | Han et al. | 349/161 |

(Continued)

FOREIGN PATENT DOCUMENTS

| | | |
|---|---|---|
| EP | 0084873 A2 | 8/1983 |
| EP | 0261896 A2 | 3/1988 |

(Continued)

OTHER PUBLICATIONS

International Search Report, PCT/EP2006/009803, mailed May 2, 2007. 9 pp.

(Continued)

*Primary Examiner* — Bumsuk Won
*Assistant Examiner* — Charles Chang
(74) *Attorney, Agent, or Firm* — Hartman Patents PLLC

(57) ABSTRACT

Applications of embodiments include the use of transmissive or transflective display technologies in extreme temperature environments. Specifically, display assemblies and methods using heating and/or active cooling are described. For example, such applications may include the use of display panels, such as LCD panels, having a diagonal dimension of 17 inches or more.

55 Claims, 17 Drawing Sheets

U.S. PATENT DOCUMENTS

| | | |
|---|---|---|
| 7,710,511 B2 * | 5/2010 | Gehlsen et al. ............... 349/64 |
| 2001/0024250 A1 | 9/2001 | Fujishiro |
| 2002/0015297 A1 | 2/2002 | Hayashi |
| 2002/0113534 A1 | 8/2002 | Hayashi |
| 2003/0214725 A1 | 11/2003 | Akiyama |
| 2004/0004424 A1 | 1/2004 | Sakurai |
| 2004/0105046 A1 | 6/2004 | Taira |
| 2004/0217701 A1 | 11/2004 | Kato |
| 2005/0073632 A1 | 4/2005 | Dunn |
| 2005/0083448 A1 | 4/2005 | Ishida |
| 2005/0088588 A1 | 4/2005 | Lee |
| 2005/0105009 A1 | 5/2005 | Dunn |
| 2005/0169013 A1 | 8/2005 | Yu |
| 2005/0231956 A1 | 10/2005 | Lescourret |
| 2006/0198161 A1 | 9/2006 | Lin |

FOREIGN PATENT DOCUMENTS

| | | |
|---|---|---|
| EP | 1253459 A2 | 10/2002 |
| WO | WO03056369 A1 | 7/2003 |
| WO | WO2004019121 A1 | 3/2004 |

OTHER PUBLICATIONS

Written Opinion, PCT/EP2006/009803, mailed May 2, 2007. 19 pp.

* cited by examiner

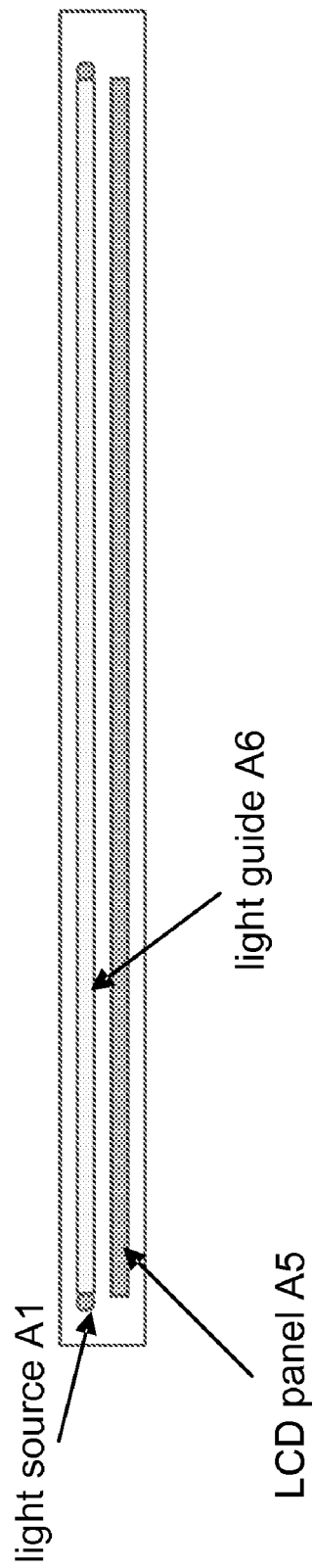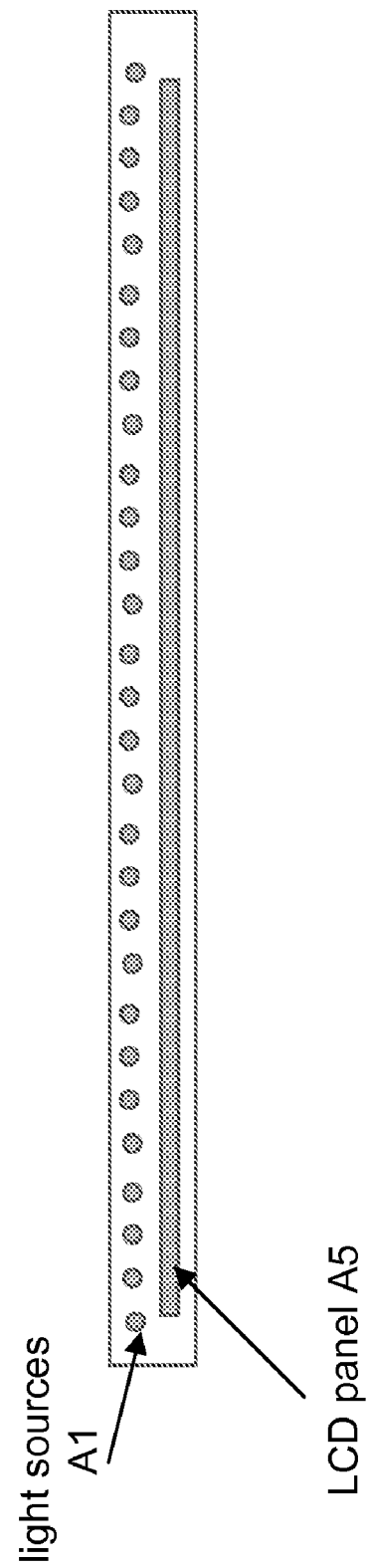

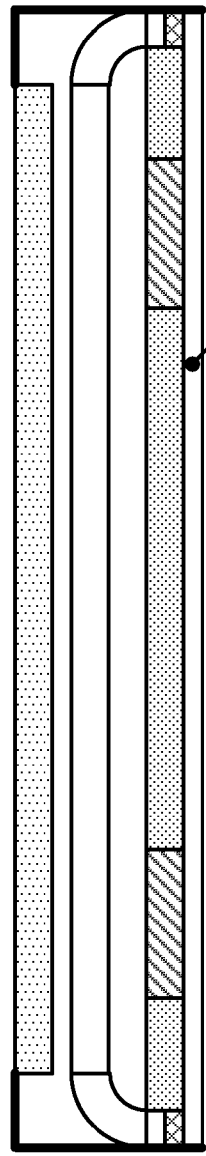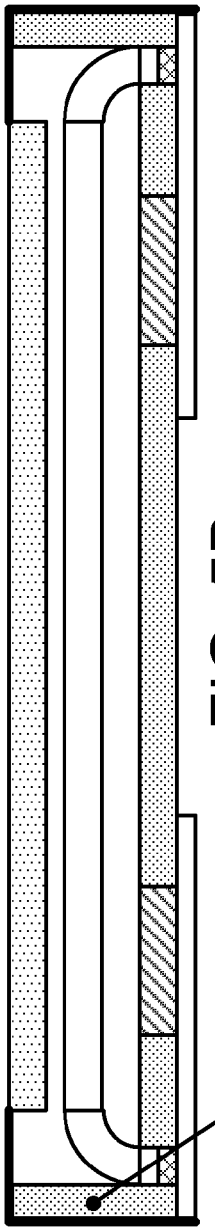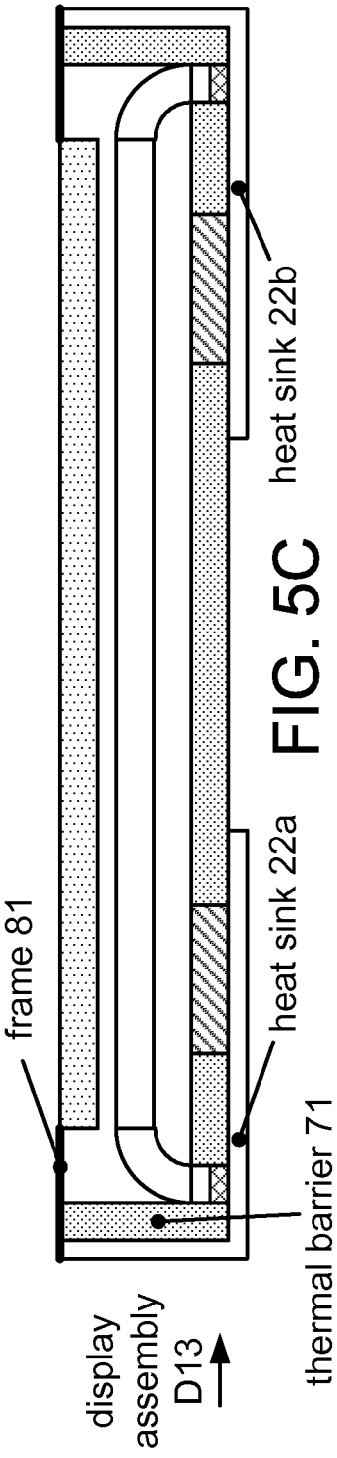

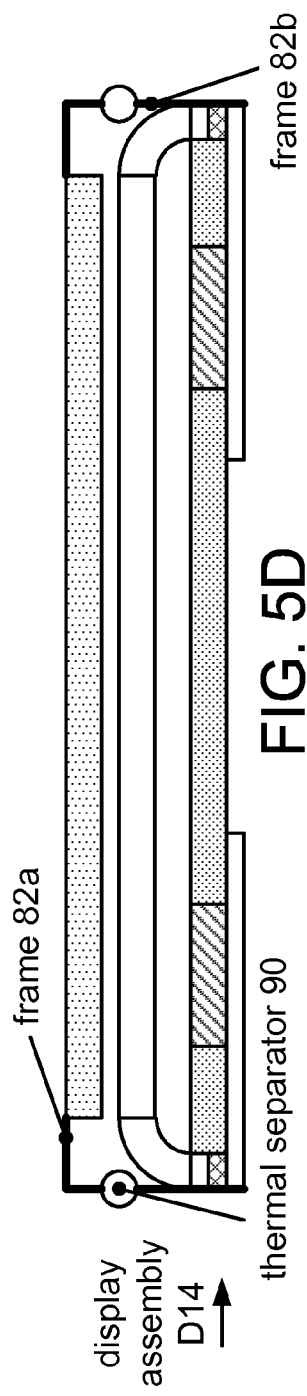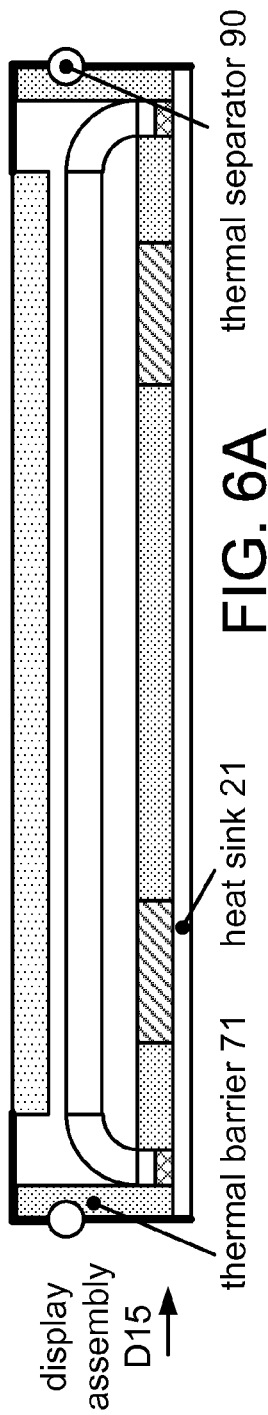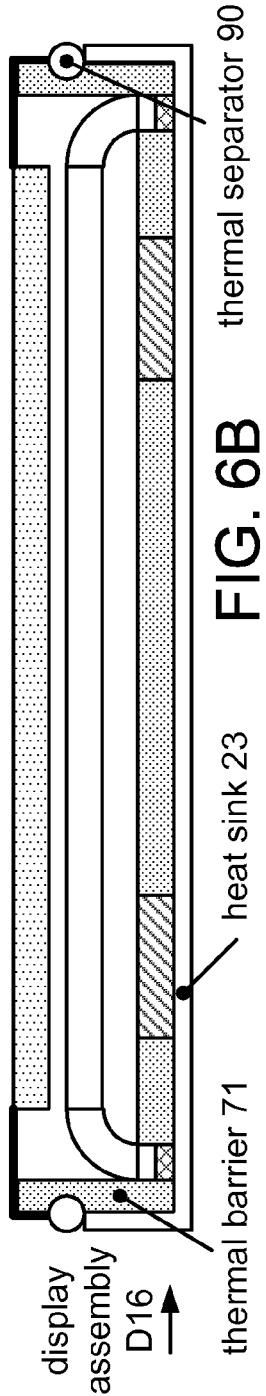

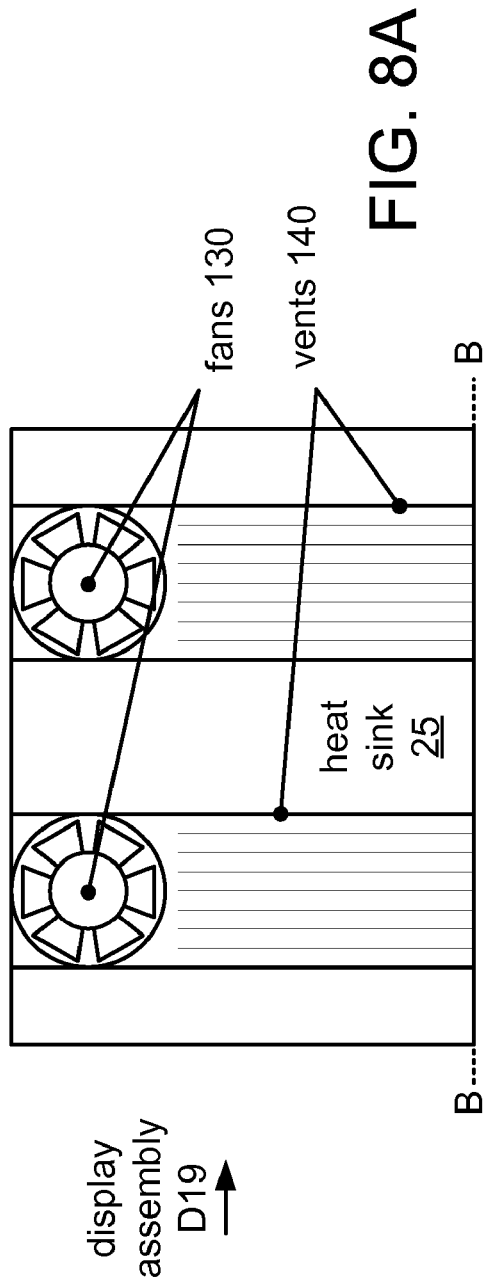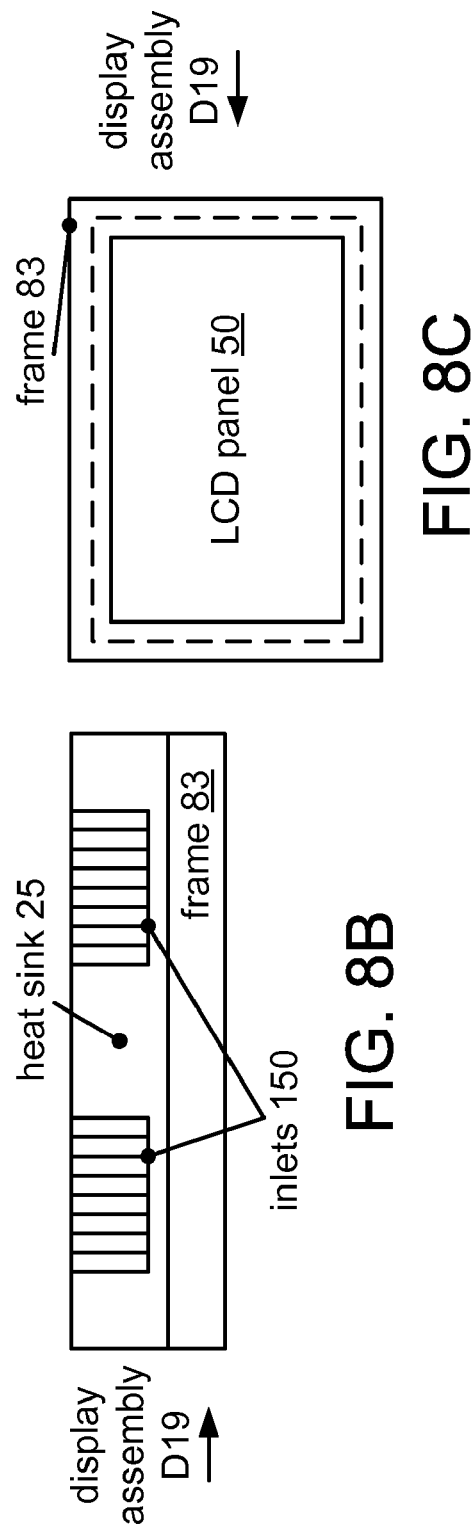

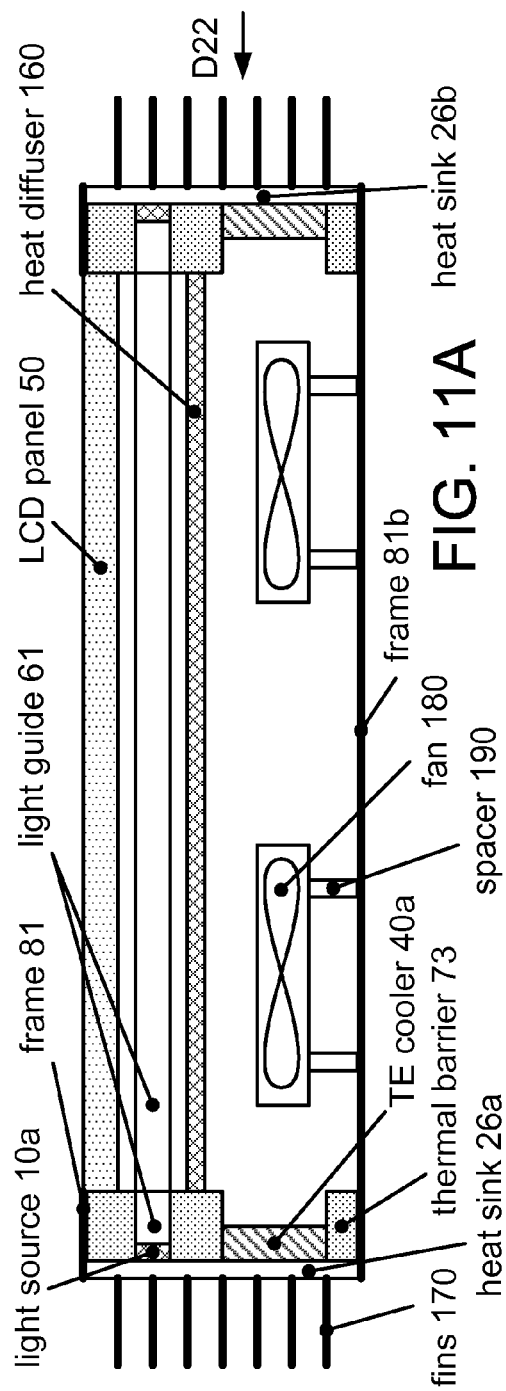
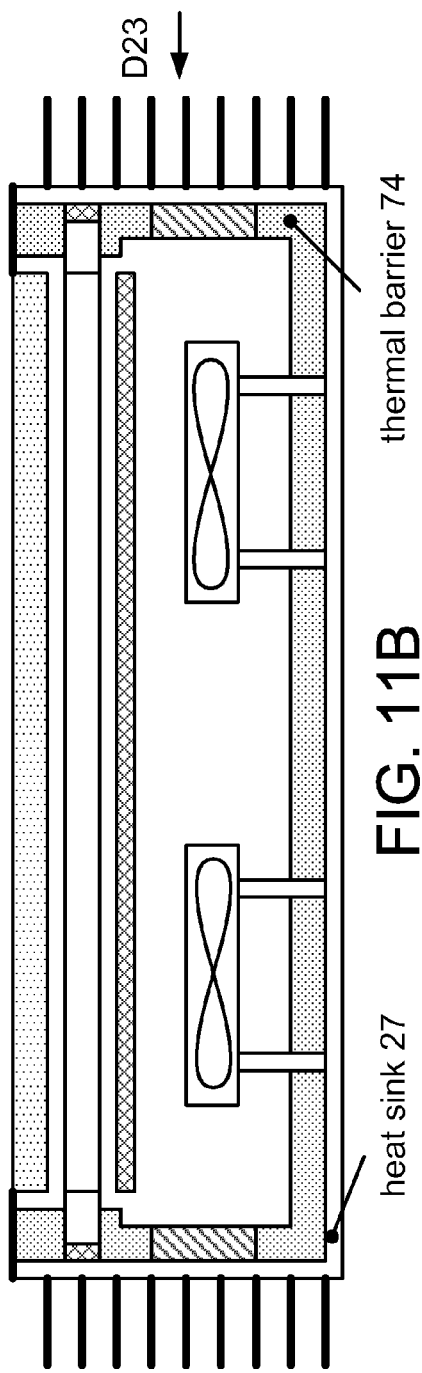
FIG. 11A
FIG. 11B

US 8,400,607 B2

DISPLAY ASSEMBLIES AND METHODS OF DISPLAY

RELATED APPLICATIONS

This patent application claims benefit of U.S. Provisional Pat. Appl. No. 60/724,787, entitled "DISPLAY PANELS AND METHODS OF DISPLAY," filed Oct. 11, 2005.

FIELD OF THE INVENTION

This invention relates to image display.

BACKGROUND

A liquid crystal display (LCD) assembly generally includes a glass LCD panel, a backlight system, and LCD driver electronics. The display assembly may also include an interface card to convert an analog or digital video signal (such as digital video interface or DVI) into another form such as low-voltage differential signaling (LVDS). Typical advantages of LCD technology over cathode-ray tube (CRT) technology include a smaller size and less weight for a similar display area.

FIG. 1A shows a cross-section of a display assembly including an LCD panel A5 and a light guide A6 edge-lit by one or more light sources A1 such as light-emitting diodes (LEDs) and/or fluorescent lamps. FIG. 1B shows a cross-section of an LCD with several light sources (such as cold-cathode fluorescent lamps or CCFLs) arranged as a curtain backlight.

Operating environments for LCD assemblies may be limited in temperature due to the nature of the liquid crystal (LC) technology. Above a particular temperature, the LC molecules become randomly or chaotically oriented, rather than being aligned according to the applied electric field. At high temperatures, therefore, a current state-of-the-art large-size LCD panel (for example, a panel having a diagonal dimension of 17 inches or larger) will become opaque, yielding a black display regardless of the state of the driving signal. This phenomenon, called "clearing" of the panel, is temporary and nondestructive, but it limits use of the panel to within certain temperature limits.

In recent years, it has become common for LCD panels to include liquid crystal materials having lower viscosities than before (e.g., by using additives). Panels using such mixtures tend to have faster response times, but the lower viscosities may also contribute to lower clearing temperatures.

Although LCD technologies capable of operating in higher-temperature environments exist, they are commercially available only in smaller-size displays and have other disadvantages such as longer rise and fall times, which results in poor representation of live video footage. At the other end of the temperature spectrum (e.g., at temperatures below 0° C.), the response of the LCD becomes very slow. In extreme cases the LCD material can freeze. While these effects may also be nondestructive, they limit the use of LCD technology in extreme temperature environments.

SUMMARY

A display assembly according to one embodiment includes a heat sink, a light source thermally coupled to the heat sink, and a liquid crystal display panel arranged to transmit light produced by the light source. This assembly also includes thermal insulation disposed to thermally insulate the liquid crystal panel from heat generated by the light source, and an active cooling device arranged to actively transfer heat away from the liquid crystal display panel and to a side of the thermal insulation facing the heat sink.

A display assembly according to another embodiment includes a thermal barrier; a heat sink located on a first side of the thermal barrier; and a light source thermally coupled to the heat sink. This assembly also includes a liquid crystal display panel (A) located on a second side of the thermal barrier opposite the first side and (B) arranged to transmit light produced by the light source; and an active cooling device arranged to actively transfer heat from the second side of the thermal barrier to the first side of the thermal barrier.

A display assembly according to a further embodiment includes a light source; a liquid crystal display panel; and means for thermally insulating the liquid crystal display panel from heat generated by the light source. This assembly also includes means for transporting light produced by the light source from a first side of the means for thermally insulating to a second side of the means for thermally insulating; and, on the second side of the means for thermally insulating, means for directing the transported light through the liquid crystal display panel. This assembly also includes means for actively transporting heat energy from a cooler side of the means for thermally insulating to a warmer side of the means for thermally insulating.

A method of image display according to an embodiment includes operating a light source to produce light, where the light source is thermally coupled to a heat sink; and transporting the produced light from a first side of a thermal barrier to a second side of the thermal barrier opposite to the first side. This method also includes, on the second side of the thermal barrier, directing the transported light through a liquid crystal display panel. This method also includes, during the act of operating a light source, using at least one active cooling device to actively transport heat from the second side of the thermal barrier to the first side.

A method for actively cooling a transmissive or transflective display according to an embodiment includes using a thermal isolation around a transmissive or transflective display element, and transporting the light from a backlight light source situated outside the thermal isolation into the isolated part in order to be able to use this display technology in high ambient temperatures.

A display assembly according to a further embodiment includes a thermal barrier; a light source located on a first side of the thermal barrier; a liquid crystal display panel (A) located on a second side of the thermal barrier opposite the first side and (B) arranged to transmit light produced by the light source; and a heater located on the second side of the thermal barrier.

A display assembly according to a further embodiment includes a thermal barrier; a light source located on a first side of the thermal barrier; a liquid crystal display panel (A) located on a second side of the thermal barrier opposite the first side and (B) arranged to transmit light produced by the light source; and a heater arranged to increase the temperature of the liquid crystal display panel with respect to a temperature of the ambient environment of the assembly.

A display according to a further embodiment includes a display panel, a chamber arranged to thermally isolate the panel from an ambient environment, a light source disposed outside the chamber, and a light guide configured to conduct light from the light source into the chamber and to distribute the light across a back surface of the panel.

A method for actively heating a transmissive or transflective display according to an embodiment includes using a thermal isolation around a transmissive or transflective display element, and transporting the light from a backlight light source situated outside said isolation into the isolated part in order to be able to use blinking backlight or color sequential backlight technology at low ambient temperatures, preserving the ability to operate at high temperatures.

BRIEF DESCRIPTION OF THE DRAWINGS

FIG. 1A shows a diagram of a display assembly having an edge-lit backlight.

FIG. 1B shows a diagram of a display assembly having a curtain backlight.

FIG. 5A shows a cross section of an implementation D11 of display assembly D10 having a heat sink 21 to which both TE coolers 40 are thermally coupled.

FIG. 5B shows a cross section of an implementation D12 of display assembly D10 having a thermal barrier 71 between light guide 60 and frame 80.

FIG. 5C shows a cross section of an implementation D13 of display assembly D12 having heat sinks 22 that each extend to at least one lateral side of the display assembly.

FIG. 5D shows a cross section of an implementation D14 of display assembly D10 having a thermal separator 90 between front and back portions 82a, 82b of frame 82.

FIG. 6A shows a cross section of an implementation D15 of display assembly D10 having a thermal separator 90, a thermal barrier 71 and a heat sink 21.

FIG. 6B shows a cross section of an implementation D16 of display assembly D15 having an implementation 23 of heat sink 21 that extends to at least two lateral sides of the display assembly.

FIG. 8A shows a back view of an implementation D19 of display assembly D10 having a heat sink 25 equipped with fans 130 and cooling vents 140.

FIG. 8B shows a side view of display assembly D19 (along line B-B as shown in FIG. 8A) illustrating inlets 150 of cooling vents 140.

FIG. 8C shows a front view of display assembly D19.

FIG. 11A shows a cross section of an implementation D22 of display assembly D10 in which TE coolers 40 are perpendicular to LCD panel 50 and including interior fans 180.

FIG. 11B shows a cross section of an implementation D23 of display assembly D22 having a thermal barrier 74 extending along at least three interior walls of the assembly.

Throughout the figures, like reference labels indicate identical or similar elements. The various shadings in the figures serve only to aid in distinguishing the various components and do not necessarily indicate relative characteristics such as conductivity or transparency.

DETAILED DESCRIPTION

In the description and claims, the term "substantially parallel" means within thirty degrees of parallel, and the term "substantially planar" means having a generally uniform thickness and having surface dimensions that are both much larger (e.g., ten to 100 times or more) than the thickness. The terms "substantially on" and "substantially off" are defined with reference to an average output level during an active portion of an operating cycle, with "substantially on" indicating an output within 75% of this level, and the term "substantially off" indicating an output at 25% or less of this level.

Applications of embodiments include the use of transmissive or transflective display technologies in extreme temperature environments. For example, such applications may include the use of display panels, such as LCD panels, having a diagonal dimension of 17 inches or more. Such a panel may have a resolution of 1280×1024, or 1600×1200 pixels, or more. It may be desirable to operate such panels continuously in ambient temperatures exceeding the clearing temperature of the panel (for example, an ambient temperature of 71 degrees Celsius or more). Additionally or in the alternative, it may be desirable to obtain a luminance response of the panel at low ambient temperatures that is comparable in speed to operation of a conventional panel at normal temperatures, such that an acceptable video performance may be achieved. For applications in daylight or other high ambient illumination, it may also be desirable to obtain a panel illumination of more than 500 nits (candelas per square meter). Embodiments may also be configured to include smaller panels instead, such as panels having a diagonal dimension of 15 or 12 inches or less.

With the LC materials used in today's state-of-the-art large-size panels (for example, having a diagonal dimension above 17 inches), clearing effects begin at a temperature of around 70° C. While this temperature is a minimum LCD glass temperature for the effect to begin, clearing typically starts at an ambient temperature of much less than 70° C., due to self-heating of the LCD display. Because of heat generation of the backlight and the driver electronics, for example, a current state-of-the-art LCD display usually clears at 55° C. While such performance may be perfectly acceptable in normal use, it is unacceptable for applications in environments at higher temperature extremes. Current approaches to cooling the LCD panel include using metal frames on the display and thermally connecting the backlight to these frames.

Figure 2A:
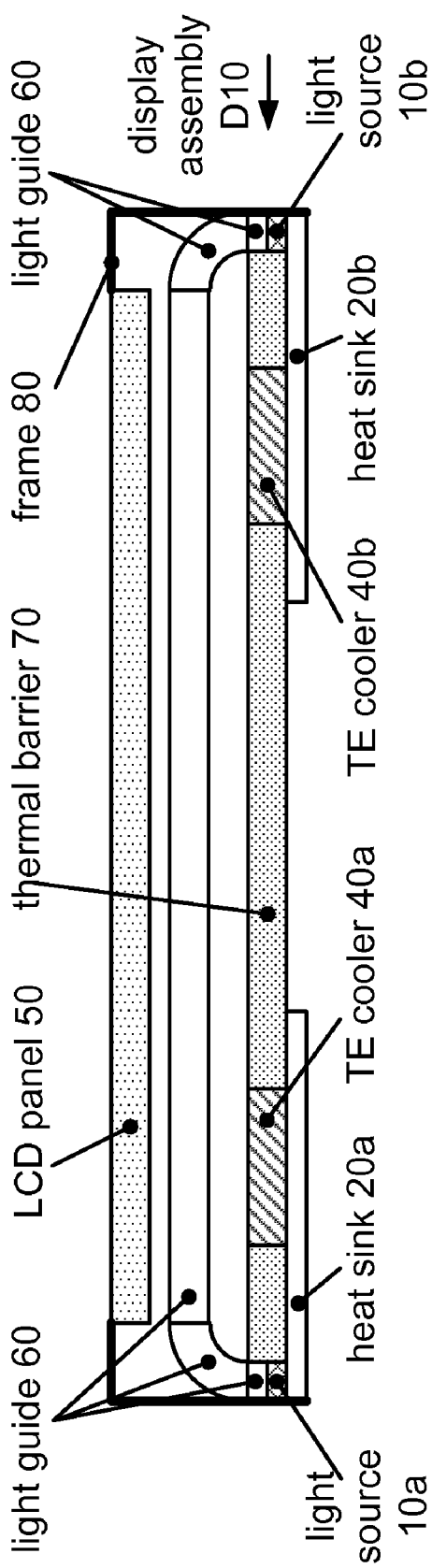
FIG. 2A shows a cross section of a display assembly D10 according to an embodiment.

FIG. 2A shows a cross section of a display assembly D10 according to an embodiment of the invention. One or more light sources 10 are arranged to illuminate a light guide 60. Each of these light sources may be implemented as a device according to one or more current state-of-the-art backlighting technologies: for example, as a cold-cathode fluorescent lamp (CCFL), hot-cathode fluorescent lamp (HCFL), or light-emitting diode (LED). The light sources 10 of a display assembly may include LEDs of different colors (such as red, green, blue or red, green, blue, white). In some cases, each light source 10 includes only one or more LEDs of the same color. In other cases, a light source 10 may include LEDs of different colors in one package or even on a single die. In one such example, each light source 10 includes red, green, and blue LEDs. In another example, some or all of light sources 10 are white LEDs. Taken together, the light sources 10 of a typical implementation of assembly D10 have a total power dissipation in the range of from 35 to 100 watts.

Figure 4:
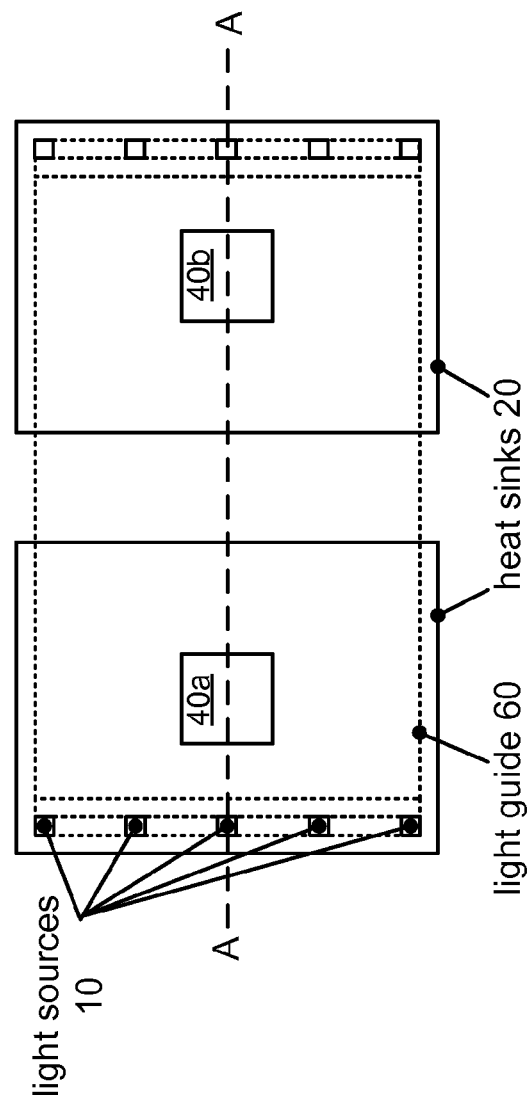
FIG. 4 shows a view from the front of display assembly D10 that illustrates relative placements of two TE coolers 40 and ten light sources 10 upon heat sinks 20.

It may be desirable for light sources 10 to provide sufficient light density to create a backlight capable of delivering high luminance in an edge-lit light guide construction. As shown in FIG. 2A, light sources 10a, 10b are arranged to illuminate opposite ends of light guide 60. As shown in FIG. 4, light sources 10 are arranged along two opposite edges of light guide 60 at a desired spacing (e.g. from one centimeter or less up to 10 centimeters). Further implementations of display assembly D10 include arrangements in which light sources 10 are disposed along one edge, or along more than two edges (e.g., four lateral edges), of a light guide. For example, the portion of light guide 60 that delivers the light to LCD panel 50 (e.g., exit plate 60c as described below) may be configured as a wedge that is illuminated along the thick edge only.

In some embodiments, the wavelength or wavelengths of the light emitted by light sources 10 and/or transmitted to LCD panel 50 by light guide 60 is limited to a range that is compliant with a Night Vision Imaging System requirement such as U.S. Military Specification MIL-L-85762A or MIL-STD-3009. For example, light sources 10 may be selected and/or filters may be used in the light path (e.g., in light guide 60 and/or LCD panel 50) such that the spectrum of the light transmitted by LCD panel 50 is attenuated at wavelengths longer than 625 or 650 nanometers.

Each light source 10 is thermally coupled to a heat sink 20 located at the rear of display assembly D10. In this context, the term "thermally coupled" means the light source is mounted such that a path of low total thermal resistance exists between the light source and the heat sink. The term "thermally coupled" also means that most of the heat energy generated by the light source is conducted to the heat sink. The path of low total thermal resistance may include one or more materials that are thermally conductive but electrically insulating. For an LED light source, for example, this path typically includes a metal core PCB having a copper layer to which the LED is soldered, an intermediate dielectric layer that is thermally conductive but electrically insulating, and an aluminum base layer that may be mounted directly to the heat sink. For a fluorescent lamp heat source, this path typically includes a holder and/or a frame that collects heat generated by the lamp and is mounted to the heat sink directly or via another thermally conductive structure.

Each heat sink 20, which may include fins and/or other structures that increase the surface area of the heat sink for heat transfer to the ambient environment, is fabricated or machined from one or more materials having a high thermal conductivity such as copper, aluminum, magnesium (for reduced weight), or an alloy of one or more such metals. Each heat sink 20 may also include channels for circulation of a heat transfer medium (e.g., water). Each heat sink 20 may be mounted to a frame 80 of the display assembly and may be configured for mounting to another structure, such as a console. In one example, each heat sink 20 is configured for thermal coupling to another heat sink, possibly having fins and/or being passively cooled (e.g., fan-cooled) or actively cooled.

An LCD panel 50, which is located at the front of display assembly D10, includes LC material between two substrates. Panel 50 is typically rectangular and may be a monochrome or color LCD display panel. In this example, LCD panel 50 is a transmissive display cell. In other embodiments, a transreflective LCD panel may be used instead, or a panel according to some other transmissive or transreflective technology. Suitable technologies include active matrix (AM), thin-film transistor (TFT), super twist nematic (STN), patterned vertical alignment (PVA), multi-domain vertical alignment (MVA), in-plane switching (IPS), and optical-compensating-bend (OCB). A panel according to another LCD technology or some other light valve, transmissive, or transreflective technology may also be used.

Panel 50 may also include one or more other coatings and/or layers. For example, panel 50 may be an optical stack including one or more anti-reflective coatings, index matching layers, and/or polarizers. Panel 50 may also include a color filter plate, a collimation foil, and/or a dual brightness enhancement film (DBEF). In some implementations, panel 50 includes an EMI shield in front of or behind the LC material, and/or a touch screen at the front of the optical stack.

Thermal barrier 70 is disposed to thermally insulate LCD panel 50 from heat generated by light sources 10 and possibly from heat generated by other components of display assembly D10 (such as a power supply and other circuitry). Thermal barrier 70 has one or more layers, each made of one or more materials having a low thermal conductivity such as fiberglass or other fiber, or Styrofoam or other foam. For better thermal isolation, it may be desired to use a closed-cell foam rather than an open-cell foam. In one example, a sheet of a polyurethane foam such as FR6700 aircraft foam having a thickness of 9 millimeters and roughly the same surface dimensions as LCD panel 50 is used.

Thermal barrier 70 may also be configured to fill other gaps within display assembly D10, such as along the interior of frame 80. Thermal barrier 70 may include gaskets or other seals between the various walls or sections of the display assembly and/or may be molded to form a well within which LCD panel 50 and at least an exit portion of light guide 60 are disposed. However, especially for an assembly in which light sources 10 are rear-mounted and coupled to one or more back-facing heat sinks, the four sides are comparatively small and insulating them may have only a limited influence on performance.

Display assembly D10 includes one or more active cooling devices arranged to actively transport heat away from the LCD panel side of thermal barrier 70. In an active cooling device, heat energy is transported from a colder side of the device to a warmer side of the device, which is opposite to the natural flow of heat energy. Such devices include devices having a mechanical pump (for example, a compressor) and a heat exchanger (for example, including one or more heat valves), such as a refrigeration unit. Other active cooling devices include thermoelectric devices such as devices that make use of the Peltier effect.

In a display assembly D10 according to the example of FIG. 2A, thermoelectric coolers 40 actively transfer heat from one side of thermal barrier 70 (e.g., the side on which LCD panel 50 is located) to the other side of the thermal barrier (e.g., the side on which heat sinks 20 are located). A TE cooler 40 may be implemented as one or more Peltier elements, which create a temperature differential between opposite sides of the element upon application of an electric potential. Other active heat exchange technologies may also be used to remove heat from the LCD panel side of thermal barrier 70, such as a refrigeration device having a compressor and a heat exchanger. Use of a refrigeration device may allow for more freedom in positioning the hot and cold parts of the device independently of one another, as compared to a Peltier device.

Other promising thermoelectric cooling technologies have also been described, such as "cool chips" using thermotunneling as described at www.coolchips.gi and in patent literature cited therein. Although at the present time such devices are not commercially available, the use of TE coolers 40 based on such technologies is expressly contemplated and hereby disclosed.

Embodiments include arrangements in which an LCD panel is cooled with one or more Peltier elements or by any of the other technologies appropriate to cool down an LCD panel. If an LCD panel is cooled only with Peltier elements, the cooling effect may be low and at the expense of a high additional power consumption. The LCD panel may be too big to cool, and the heat transferred by the Peltier elements may re-circulate back to the panel. A thermal barrier between the LCD and the environment can give some advantage. However, the backlight power is not negligible, and the heat generated by the backlight may be too much to transport with at least some of the existing active cooling technologies.

Frame 80 is configured as needed to cover exposed elements of display assembly D10 and/or to provide other qualities to the assembly such as strength, rigidity, low weight, and/or electromagnetic interference (EMI) shielding. Frame 80 may be constructed partially or substantially entirely of sheet metal, for example. The front portion of frame 80 may include a bezel portion covering a perimeter of LCD panel 50 (as shown in FIG. 8C, for example). In such a case, it may be desirable to configure frame 80 to include a metal bezel for strength and EMI shielding, although it may also be desirable to configure the bezel so that it does not conduct heat to LCD panel 50. For example, the bezel may be thermally insulated from LCD panel 50 and/or from another portion of frame 80.

Light guide 60 transports light produced by light sources 10 to LCD panel 50. Light guide 60 is edge-lit on one or more edges by light sources 10. In one example, groups of red, blue, and green LEDs are arranged along each of one or more edges at a desired spacing (e.g. from one centimeter or less up to 10 centimeters). In other embodiments, a curtain backlight may be used (as shown in FIG. 1B, for example).

Figure 2B:
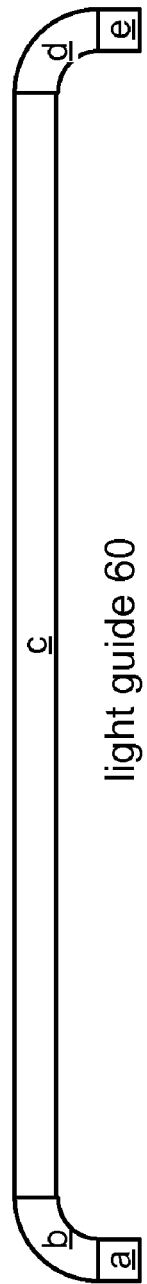
FIG. 2B shows a cross section of light guide 60.
Figure 15:
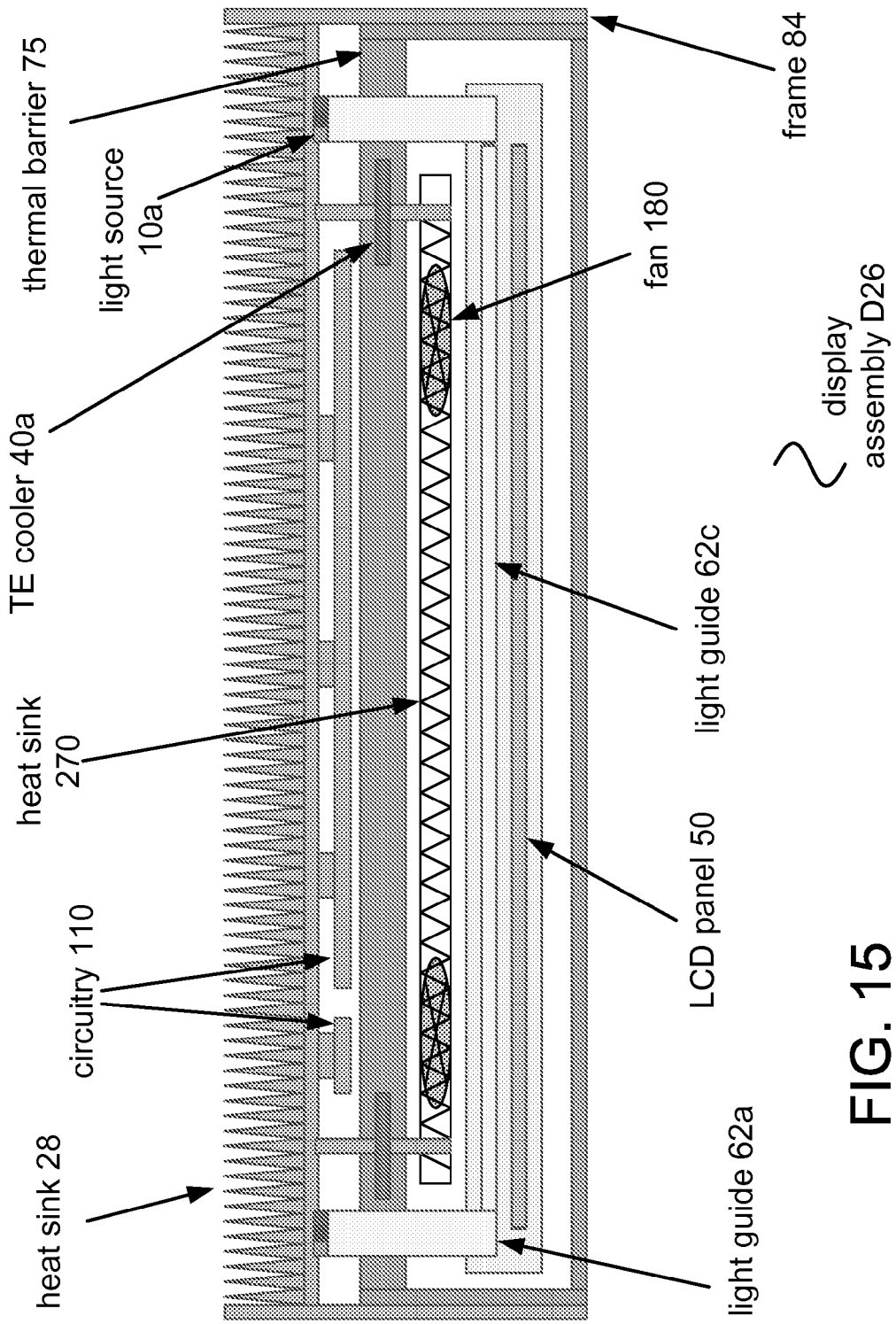
FIG. 15 shows a cross section of an implementation D26 of display assembly D25 having interior fans 180 and circuitry 110 that is thermally coupled to heat sink 28.

As shown in the cross section of FIG. 2B, light guide 60 may be configured to have several sections. In this example, an edge of a receiving section 60a is arranged to receive the light produced by light sources 10a, and an edge of a receiving section 60e is arranged to receive the light produced by light sources 10b. Each of the transport sections 60b and 60d is arranged to conduct the light from the corresponding receiving section to exit plate 60c. As shown in FIG. 2A, the transport sections 60b and 60d may be configured to provide a smooth 90-degree angle from the normal of the entrance plane to the normal of the exit plane. It may be desirable to use long transport sections to provide more distance and thus more thermal isolation between the edge of LCD panel 50 and light sources 10. Other implementations of a transport section (e.g., as illustrated in FIG. 15) may provide for a more abrupt 90-degree angle.

Exit plate 60c is configured to provide a desired distribution of the illumination across the back surface of LCD panel 50 and typically has roughly the same surface dimensions as LCD panel 50. Exit plate 60c may also be in contact with LCD panel 50, possibly via one or more intermediate layers (e.g., an optical adhesive and/or index matching layer).

Examples of materials from which exit plate 60c may be made include alicyclic structure-containing polymer resins such as norbornene polymers and vinyl acrylic hydrocarbon polymers; acrylic resins such as polymethylmethacrylate (PMMA); and polyolefin resins such as polystyrene resin. It may be desirable for exit plate 60c to be made from a material having an index of refraction at least equal to 1.41. It may also be desirable for exit plate 60c to have properties such as low thermal conductivity and/or resistance to clouding from ultra-violet radiation.

Exit plate 60c may be patterned, printed, etched, molded, tapered, and/or faceted to provide a desired distribution of the illumination across the back surface of panel 10. For example, such a pattern may be on the order of 10 to 100 microns. In one example, exit plate 60c is implemented as a PMMA plate having a back surface that is printed with an array of dots and a diffuser, a brightness enhancement film (BEF), and/or a DBEF at its front surface. The pattern of dots may be arranged such that the distribution of dots is more dense in the center of exit plate 60c (i.e., where less light is available) than at the edges (i.e., where more light is available). Portions of light rays incident on the dots will reflect out the front surface of the exit plate. In some such implementations of exit plate 60c the dots are white, while in others the dots are colored (e.g., to provide a uniform color temperature). As an alternative to a printed dot array, which may cause some light loss through absorption, the back surface of exit plate 60c may be microstructured with a pattern that may also have a variable density.

In a case where colored LEDs are used to provide white light, it may be desirable for the receiving and/or transport sections to be configured to perform mixing of the colored light. For example, such sections may be translucent or include reflective, diffusing, scattering, or distributing structures. Alternatively, sections 60a, 60b, 60d, and 60e may be made of the same material as section 60c (e.g., PMMA), such that sections 60a-e may be molded as a single piece or formed from a single continuous sheet.

Different sections of light guide 60 may have different surfaces (e.g., surfaces to promote internal mixing vs. a back surface to promote emission from the opposite surface). In a particular example, each pair of receiving and transport sections of light guide 60 (e.g., sections 60a and 60b, and sections 60d and 60e) is implemented as a single hollow structure having highly reflective interior walls. Such walls may be provided by lining the inner surfaces with a foil such as enhanced specular reflector (ESR) film (e.g. Vikuiti™ ESR film, 3M Corp., St. Paul, Minn.) or by plating or otherwise depositing a chromium layer on the inner surfaces of the structure. The hollow structure may be made of plastic and/or a metal having a relatively low thermal conductivity, such as stainless steel.

Figure 3A:
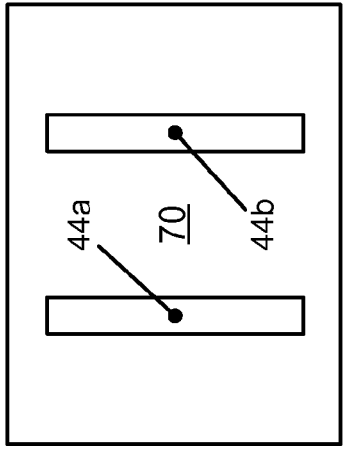
FIGS. 3A-3C are views from the front of display assembly D10 that show alternate relative placements of thermoelectric (TE) coolers 40 and thermal barrier 70.
Figure 3B:
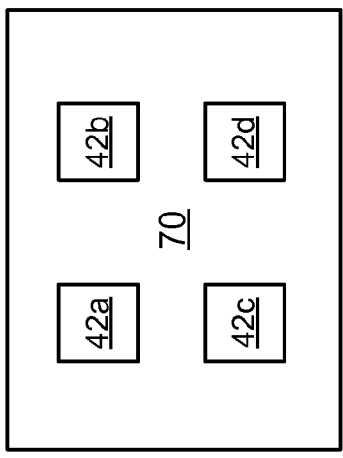
Figure 3C:
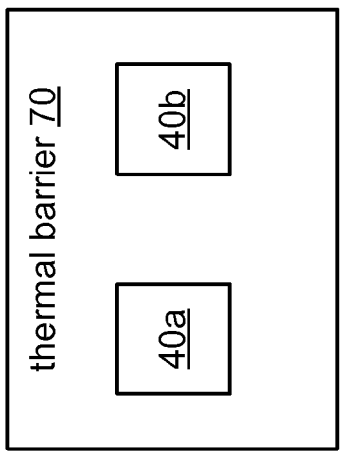

Thermoelectric coolers 40 may be positioned in holes or gaps within thermal barrier 70. FIGS. 3A-3C are views from the front of display assembly that show three examples of relative placements of TE coolers 40 within thermal barrier 70. It is possible but not necessary for TE coolers 40 and thermal barrier 70 to have the same thickness, and in some implementations thermal barrier 70 may be thicker than TE coolers 40. In such cases, heat pipes or other thermally conductive structures (e.g., forms fabricated from copper or aluminum plate) may be used to thermally couple TE coolers 40 to heat sink 20 and/or heat diffuser 160 (e.g., as described with reference to FIG. 9 below).

Other implementations of display assembly D10 include an active cooling device, such as a refrigeration unit, having separable hot and cold sides. In such case, the cold side of the active cooling device may be positioned on one side of thermal barrier 70, and the hot side may be positioned on the other side of thermal barrier 70. The holes in thermal barrier 70 needed to connect the hot and cold sides (e.g., for the conduits carrying the heat transfer medium between the two sides) may be reduced in area in such an assembly as compared to the holes shown in FIGS. 3A-3C.

FIG. 4 shows a view from the front of display assembly D10 that illustrates relative placements of two TE coolers 40 and ten light sources 10 upon heat sinks 20. In this figure, the dotted lines indicate the relative placement of light guide 60 above these components. The cross-section shown in FIG. 2A is taken along the dashed line A-A shown in FIG. 4.

Display assembly D10 embodies a combination of a set of basic elements, and display assemblies that include variations of one or more of these basic elements are now described. It is noted that each of the various implementations of these basic elements as described herein retains the characteristics (or the full range of alternative characteristics) of the corresponding basic element, unless the implementation is described to exclude that characteristic or unless the particular characteristic is plainly incompatible with one or more of the distinguishing features of that implementation of the element.

In FIGS. 5A-5D, 6A-6B, and 7A-7B, components that are as illustrated in FIG. 2A are shown without labels for easier recognition of the differences being presented.

Many variations of configurations and compositions of elements shown in FIG. 2A are possible, depending on the particular design and cost criteria. For example, FIG. 5A shows a cross section of an implementation D11 of assembly D10 that has one heat sink, an implementation 21 of heat sink 20 that extends across the rear of the display assembly. FIG. 5B shows a cross section of an implementation D12 of assembly D10, which includes an implementation 71 of thermal barrier 70 that extends along two or more sides of the assembly (e.g., between frame 80 and LCD panel 50).

FIG. 5C shows a cross section of another implementation D13 of assembly D12, in which each heat sink 22 extends along at least one side of the assembly. In this case, frame 81 may be largely just a front bezel, and each heat sink 22 may include fins located at the back and/or side of the assembly.

FIG. 5D shows a cross section of an implementation D14 of assembly D10 in which the frame has front and back parts 82a, b, with a thermal separator 90 between them. Thermal separator 90 may be implemented as an insulating ring or gasket separating a bezel portion of the frame (e.g., 82a) from a back and/or side portion that may be heated directly or indirectly by light sources 10 (e.g., 82b). Depending on the particular application, materials suitable for thermal separator 90 may include plastic, rubber, or neoprene. In a case where electrical coupling between frame portions 82a and 82b is desired (e.g., for EMI shielding), thermal separator 90 may be made of an electrically conductive material such as conductive rubber, or another electrical coupling (such as a ground wire) may be provided between the frame portions. It may also be desirable to provide on frame portion 82b, rather than on frame portion 82a, any tabs or other structures for mounting the display assembly to an external structure, such as a console or rack, which could serve as a source of heat energy.

As noted above, many variations of configurations and compositions of elements shown in FIG. 2A are possible, and variants including any combination of the features described in FIGS. 5A through 5D are expressly contemplated and disclosed. For example, FIG. 6A shows a cross section of an implementation D15 of assembly D10 that combines the thermal separator 90 of assembly D14, the thermal barrier 71 of assembly D12, and the heat sink 21 of assembly D11. FIG. 6B shows a cross section of an implementation D16 of assembly D15 having an implementation 23 of heat sink 21 that extends along at least two sides of the assembly and may also include fins located at the back and/or sides of the assembly.

Figure 13A:
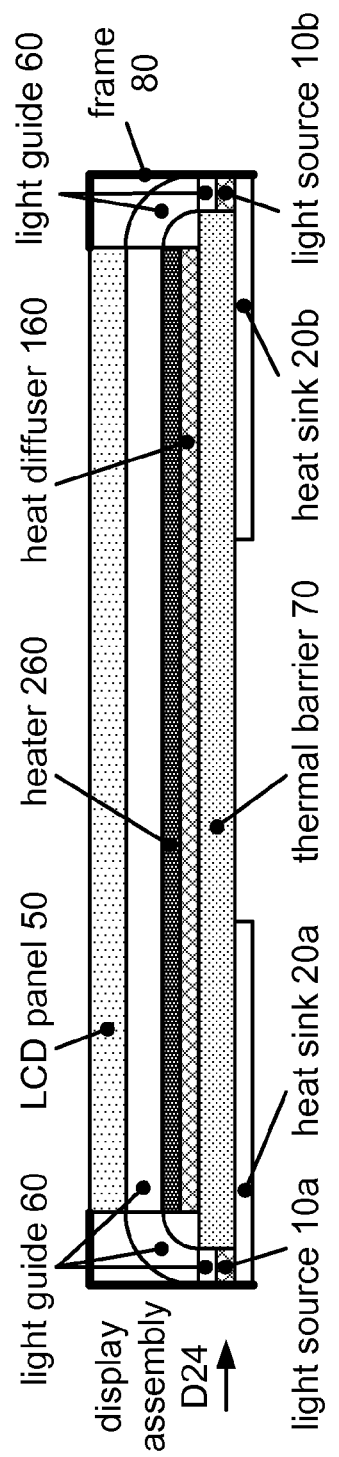
FIG. 13A shows a cross section of an implementation D24 of display assembly D10 having a heater 260 disposed between thermal barrier 70 and LCD panel 50.

An implementation of display assembly D10 may include one or more temperature sensors disposed on the LCD panel side of thermal barrier 70 (e.g., on panel 50, light guide 60, and/or heat diffuser 160) and a control circuit to activate one or more of the active cooling elements 40 and/or heating elements (e.g., heater 260 as described with reference to FIG. 13A below, or a heating layer in the optical stack) according to the sensor outputs. For example, the control circuit may be configured to activate cooling when a preset temperature threshold (e.g., corresponding to a clearing temperature of the panel) is reached or exceeded. In embodiments that include heating of the panel and/or thermally isolated chamber, the control circuit may be configured to activate heating when the sensed temperature reaches or falls below another preset temperature threshold. In either case, the control circuit may be configured to deactivate or reduce the cooling or heating action when a corresponding desired temperature point is sensed (e.g., a target temperature of LCD panel 50, or a point on a predefined hysteresis loop). The temperature sensors of such an assembly may also include one or more sensors disposed to sense a temperature of the ambient environment.

A typical display assembly also includes a PCB that provides the drive signals for the LCD pixel transistors. For example, this driver PCB may receive an LVDS (low voltage differential signaling) or TMDS (transition minimized differential signaling) signal and provide corresponding analog drive signals to LCD panel 50. The connection from the driver PCB to LCD panel 50 is typically in the form of copper traces on a flexible PCB, while the LVDS or TMDS signal may be carried to the driver PCB by one or more twisted pairs. Placement of this PCB within an implementation of display assembly D10 may depend upon how much power the PCB dissipates. Typically such a driver PCB dissipates about five watts, such that it may be preferable to place the driver PCB on the LCD panel side of thermal barrier 70, rather than to place it on the heat sink side of thermal barrier 70 such that the copper traces to LCD panel 50 (which provide a path of low thermal resistance) may conduct a greater amount of heat energy across thermal barrier 70. If the driver PCB dissipates more heat than would be conducted across thermal barrier 70 by the traces, however (e.g., if the PCB includes other signal processing circuitry), it may be preferable to place the PCB on the heat sink side of thermal barrier 70. Placing the driver PCB within thermal barrier 70 or otherwise insulating the driver PCB from heat sink 20 may also be an option in the particular display assembly implementation.

A display assembly (such as an implementation of assembly D10 or D25 described below) may also include other circuitry such as a power supply for the display, a signal processing unit (possibly including a graphics processing unit or GPU) configured to process an image or video signal to be displayed, and/or a power driver for light sources 10. Such circuitry may include PCBs such as an interface card or other circuit configured to convert an incoming video signal in analog or digital (e.g. DVI) format into an LVDS or TMDS format for processing by the driver PCB and/or to perform other video processing operations such as scaling. In some applications, the display assembly may also include a CPU. Such integration, which may reduce total system weight and/or size, may be desired in an application such as a vehicular display application. It may also be desired to configure the display CPU as a thin client and possibly to include other functionality such as a USB interface for enhanced connectivity and/or a GPU for enhanced graphics capability. It may be desirable to isolate LCD panel 50 from circuitry 110, which may have a total power dissipation in the range of from fifteen to forty watts. For cases in which circuitry 110 includes a single-board computer having a CPU and GPU, for example, it is even possible for the total power dissipation of circuitry 110 to reach or exceed 200 watts. It is possible for the total power dissipation of an implementation of display assembly D10 to reach or exceed 300 watts.

Figure 7A:
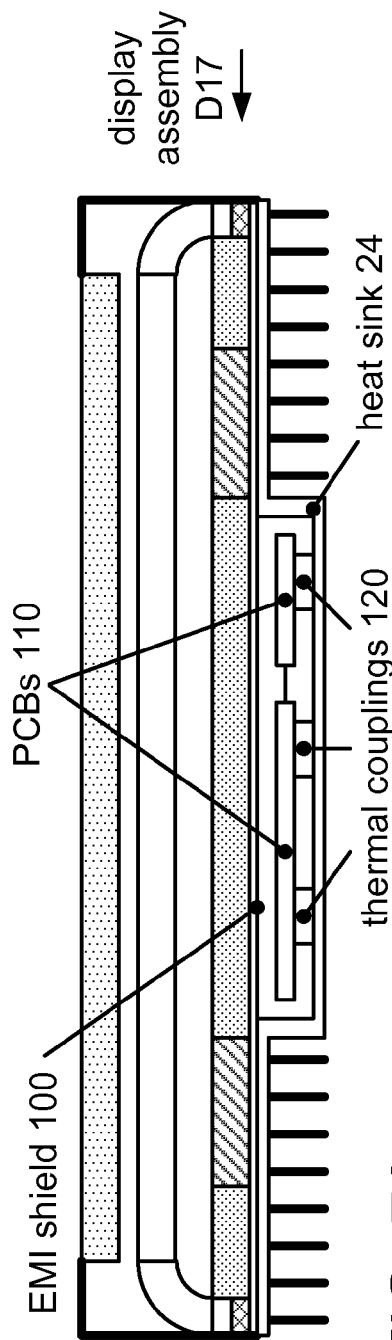
FIG. 7A shows a cross section of an implementation D17 of display assembly D10 having an EMI shield 100 and including printed circuit boards (PCBs) thermally coupled to a finned implementation 24 of heat sink 21.

FIG. 7A shows a cross section of an implementation D17 of assembly D10. Assembly D17 includes PCBs and/or other circuitry 110 as described above. A finned implementation 24 of heat sink 21 (or of heat sink 23) is arranged to conduct heat away from circuitry 110. For example, heat from a circuit board or chip of circuitry 110 may be conducted to heat sink 24 via a block of metal such as aluminum or copper.

Figure 7B:
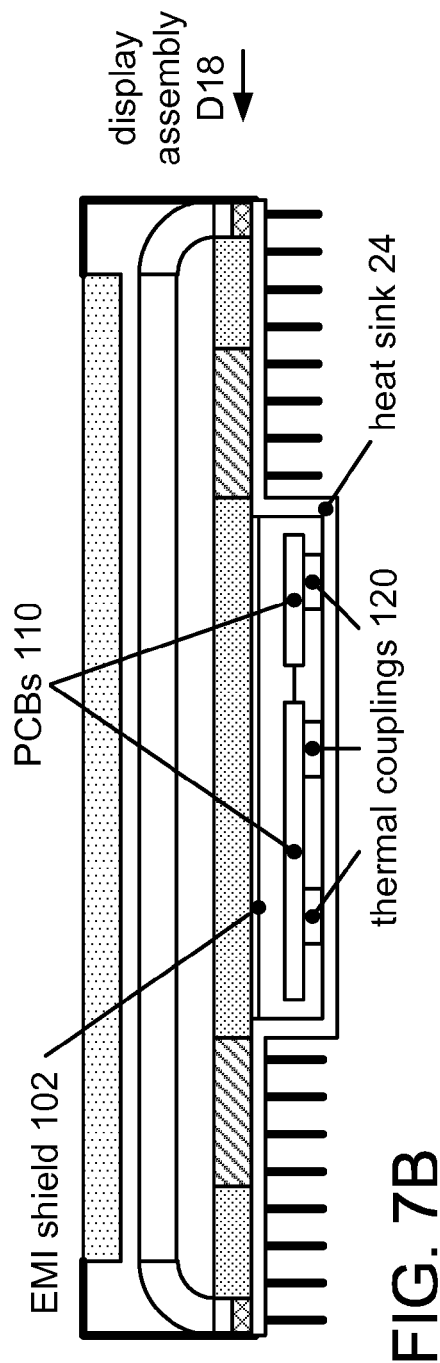
FIG. 7B shows a cross section of an implementation D18 of display assembly D17 having an implementation 102 of EMI shield 100.

Assembly D17 also includes an EMI shield arranged to block emissions of circuitry 110 from exiting the assembly via LCD panel 50. In one example, EMI shield 100 is implemented as an aluminum plate having a thickness of, e.g., one millimeter that is disposed between active coolers 40 and heat sink 24. FIG. 7B shows a cross section of an implementation D18 of assembly D17 in which an alternate implementation 102 of EMI shield 100 is disposed over circuitry 110 but not between active coolers 40 and heat sink 24, such that the coolers may be coupled directly to the heat sink.

Implementations of heat sink 20 may include fins on all or part of the sides and/or back, which may increase convective heat transfer to the ambient environment. In some cases it may be desired to cool a heat sink using forced air. FIG. 8A shows a back view of an implementation D19 of a variant of assembly D10 that has a unitary heat sink (e.g., one of D1 or D15-D18). Heat sink 25 of assembly D19 includes fans 130 arranged to draw air through cooling vents 140. Such an arrangement may be appropriate for an installation having limited rear clearance. The side view of FIG. 8B shows inlets 150 of vents 140, each having several channels for air intake as driven by fans 130. Within assembly D19, the hot sides of active cooling devices (e.g., TE coolers 40) may be directly coupled to vents 140. FIG. 8C shows a front view of assembly D19, in which a bezel of an implementation 83 of frame 80 overlaps the perimeter of LCD panel 50. For a case in which frame 83 is metallic or otherwise thermally conductive, assembly D19 may include an implementation of thermal separator 90 between frame 83 and heat sink 25.

Figure 9:
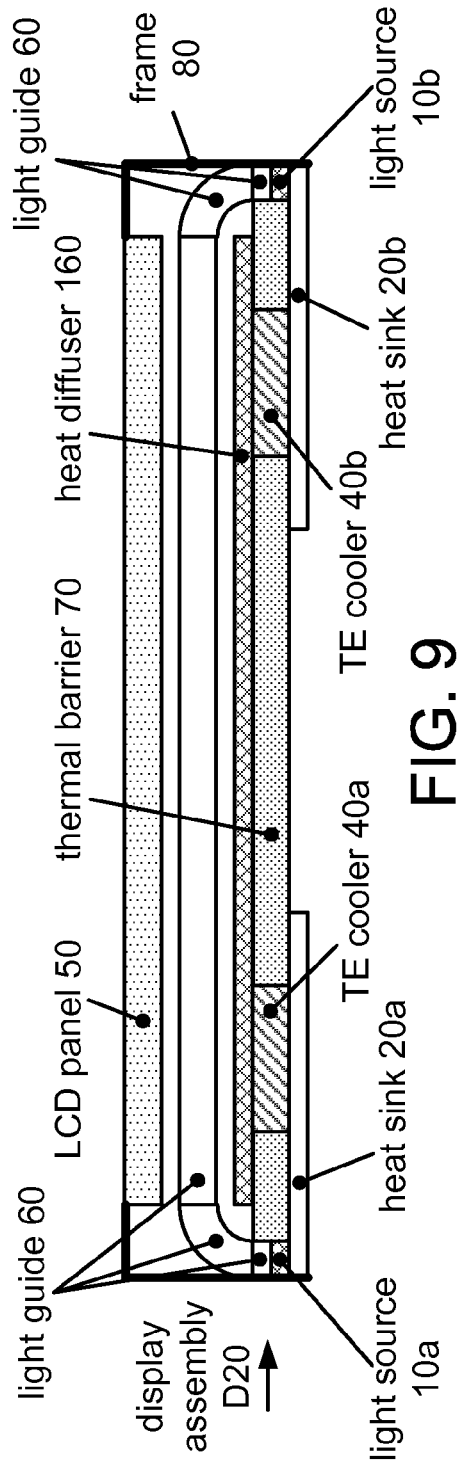
FIG. 9 shows a cross section of an implementation D20 of display assembly D10 having a heat diffuser 160.

FIG. 9 shows a cross section of an implementation D20 of assembly D10 that includes a heat diffuser 160 disposed on the LCD panel side of thermal barrier 70. Heat diffuser 160, which may provide a more even distribution of heat energy, may be implemented as an aluminum plate between thermal barrier 70 and light guide 60. In a particular example, heat diffuser 160 is implemented as an aluminum sheet having a thickness of one millimeter. Heat diffuser 160 may be configured to have roughly the same area as LCD panel 50 or exit plate 60*c*.

Heat diffuser 160 may be in thermal contact with a portion of light guide 60 such as exit plate 60*c* (possibly via one or more thermally conductive layers), which may be in optical contact with LCD panel 50 (possibly via one or more optical layers). As shown in FIG. 9, heat diffuser 160 may also be in contact with the cold side of one or more active cooling devices (e.g., TE coolers 40). Alternatively, one or more heat pipes may be used to thermally couple heat diffuser 160 to the cold side of one or more active cooling devices.

Heat diffuser 160 may be fastened to EMI shield 100 and/or to heat sinks 20. In such case, it may be desirable to limit the degree of heat transfer through the fasteners. In one example, stainless steel spacers [having a thermal conductivity of about eight watts per (meters times degrees Kelvin)] are used to secure heat diffuser 160. Alternatively, some other material of low thermal conductivity and sufficient strength, such as a plastic that can withstand the temperature range to be encountered during operation of the assembly, may be used to secure heat diffuser 160 to EMI shield 100 and/or heat sinks 20.

Figure 10:
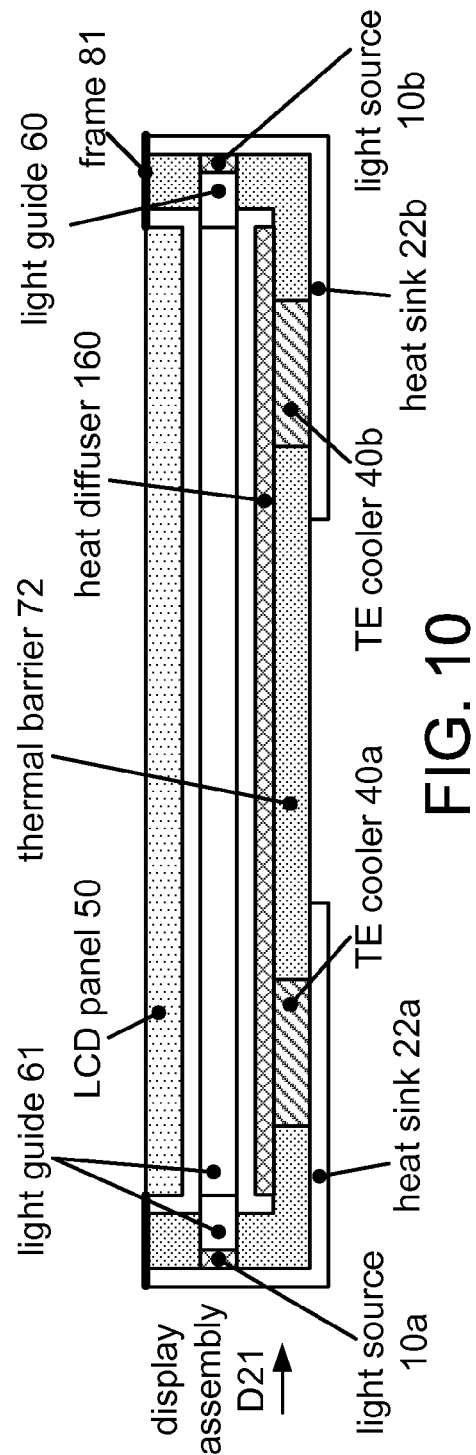
FIG. 10 shows a cross section of an implementation D21 of display assembly D10 having a substantially planar light guide 61, a heat diffuser 160, a thermal barrier 72 that extends toward the front of the assembly, and heat sinks 22 that each extend along at least one side of the assembly.

In some implementations of display assembly D10, light sources 10 are mounted at one or more sides of the assembly rather than at the rear. FIG. 10 shows a cross section of an implementation D21 of assembly D10 having side-mounted light sources 10, a substantially planar implementation 61 of light guide 60, and heat sinks 22. Light guide 61 may be implemented according to the description of light guide 60 above, with the transport sections being straight rather than curved. Such an implementation 61 of light guide 60 may be simpler than one as shown in FIG. 2B, although an assembly of this configuration may provide less thermal separation between LCD panel 50 and light sources 10 for a package of the same dimensions than one having rear-mounted light sources. (In this context, the term "substantially" indicates "at least to within a few degrees.")

FIG. 11A shows a cross section of an implementation D22 of assembly D20 that includes fans 180 arranged to provide interior circulation of a heat transfer medium (e.g., air). In this example, TE coolers 40 are disposed along at least two sides of the assembly within holes in an implementation 73 of thermal barrier 70, which is also arranged along at least two sides of the assembly. FIG. 11B shows a cross section of an implementation D23 of assembly D22 in which an implementation 74 of thermal barrier 73 and an implementation 27 of heat sink 26 both extend along the rear interior surface of the assembly.

A display assembly typically includes high-speed clock circuits (e.g., pixel clocks) that may emit EMI. It may be desired for an implementation of display assembly D10 to include an EMI shield to attenuate emissions through LCD panel 50. Such a shield may be implemented as a conductive mesh, conductive black oxide mask layer, or conductive transparent layer on or within LCD panel 50 and may be used in conjunction with an implementation of EMI shield 100 as described above.

Figure 12:
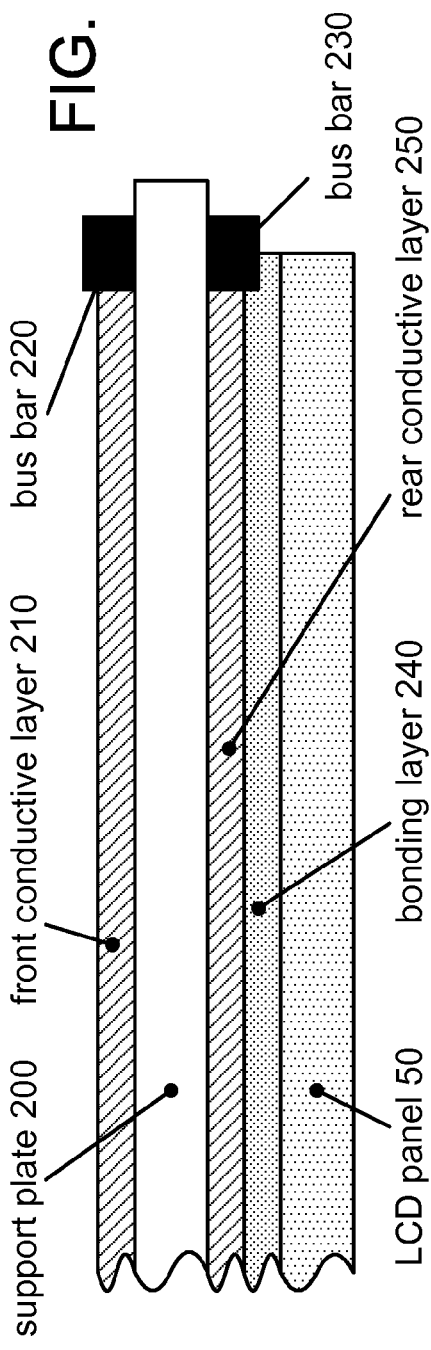
FIG. 12 shows a cross section of an optical stack including LCD panel 50 and front and rear conductive layers 210, 250.

FIG. 12 shows a cross section of an example of an optical stack including LCD panel 50 and two conductive layers 210, 250 on opposite sides of a support plate 200 (e.g., a glass plate). In this figure, light from light guide 60 is emitted through LCD panel 50 and out of the display assembly in the direction from the bottom to the top of the page. Each conductive layer 210, 250 is made of a conductive transparent material such as indium-tin oxide (ITO), which may be sputtered upon support plate 200. LCD panel is attached to rear conductive layer 250 via bonding layer 240, which may be an optical adhesive such as silicone. To support external electrical connections, a bus bar is typically electrically coupled to each of one or more sides of a conductive layer. Bus bars 220, 230 may be made of a metal having low electrical resistance such as copper or silver and may be concealed by a bezel.

In an implementation of display assembly including an optical stack as shown in FIG. 12, one of the conductive layers (e.g., front conductive layer 210) is arranged as an EMI shield. For example, the layer may be electrically connected to system ground (e.g., via frame 80). The other conductive layer (e.g., rear conductive layer 250) is arranged to heat LCD panel. In this case, layer 250 may be configured to have a sheet resistance in the range of from one to 500 ohms-squared (for example, in the range of from eight to twenty ohms-squared, such as sixteen ohms-squared).

An LCD panel operates differently than an impulse-driven display such as a CRT, and the persistence characteristic of an LCD panel may lead to artifacts in images that move over time (e.g., video footage). Additionally, the response of an LCD panel to changes in the pixel drive voltage typically becomes slower as the temperature of the panel decreases (e.g., to zero degrees Celsius or less). While a slow LC response time may have little visual effect for still images, it can result in smearing or other objectionable artifacts when moving images are being displayed. Thus, it may be desirable to heat LCD panel 50 when the ambient temperature is low. In some cases, it may be desirable to maintain a temperature of LCD panel 50 at or above forty degrees Celsius to achieve good video performance.

As described with respect to FIG. 12, an optical stack including LCD panel 50 may also include a heating layer. In some applications of LCD panel heating, however, such a heating layer may not be desired. For example, it may be desired to mount a touch screen at the front of the optical stack and to include only a rear conductive layer arranged for use as an EMI shield. FIG. 13 shows a cross section of another implementation D24 of assembly D10 that may be used in such a case.

Display assembly D24 includes a heater 260 disposed on the LCD panel side of thermal barrier 70 and arranged to elevate a temperature of LCD panel 50 above the ambient. Heater 260 may be implemented as a resistive heater including a resistive foil or film or a deposited pattern of an alloy (e.g., 80% nickel and 20% chromium) or a mixture of metal and metal oxide. Additionally or in the alternative, heater 260 may be implemented to include one or more TE coolers 40 arranged to heat the LCD panel side of thermal barrier 70 rather than to cool it. Heater 260 may be in thermal contact with, or may even be mounted or deposited upon, heat diffuser 160. Heater 260 may be in thermal contact with, and arranged to heat LCD panel 50 via, exit plate 60c of light guide 60.

Several new LCD techniques to reduce motion-related artifacts such as smearing depend on the pixel response time of the LCD panel. One such technique, called "blinking backlight," involves modulating the backlight output by disabling the backlight when the LCD is in transition from black to white or from white to black and enabling the backlight when the LCD is in a stable position after the transition. Assuming a refresh rate of 60 Hz and a backlight on-time of 50%, such a technique would require the transition time to be reduced to less than eight milliseconds. For current LC materials, such a rapid response may only be possible when the LCD has a high temperature.

Figure 13B:
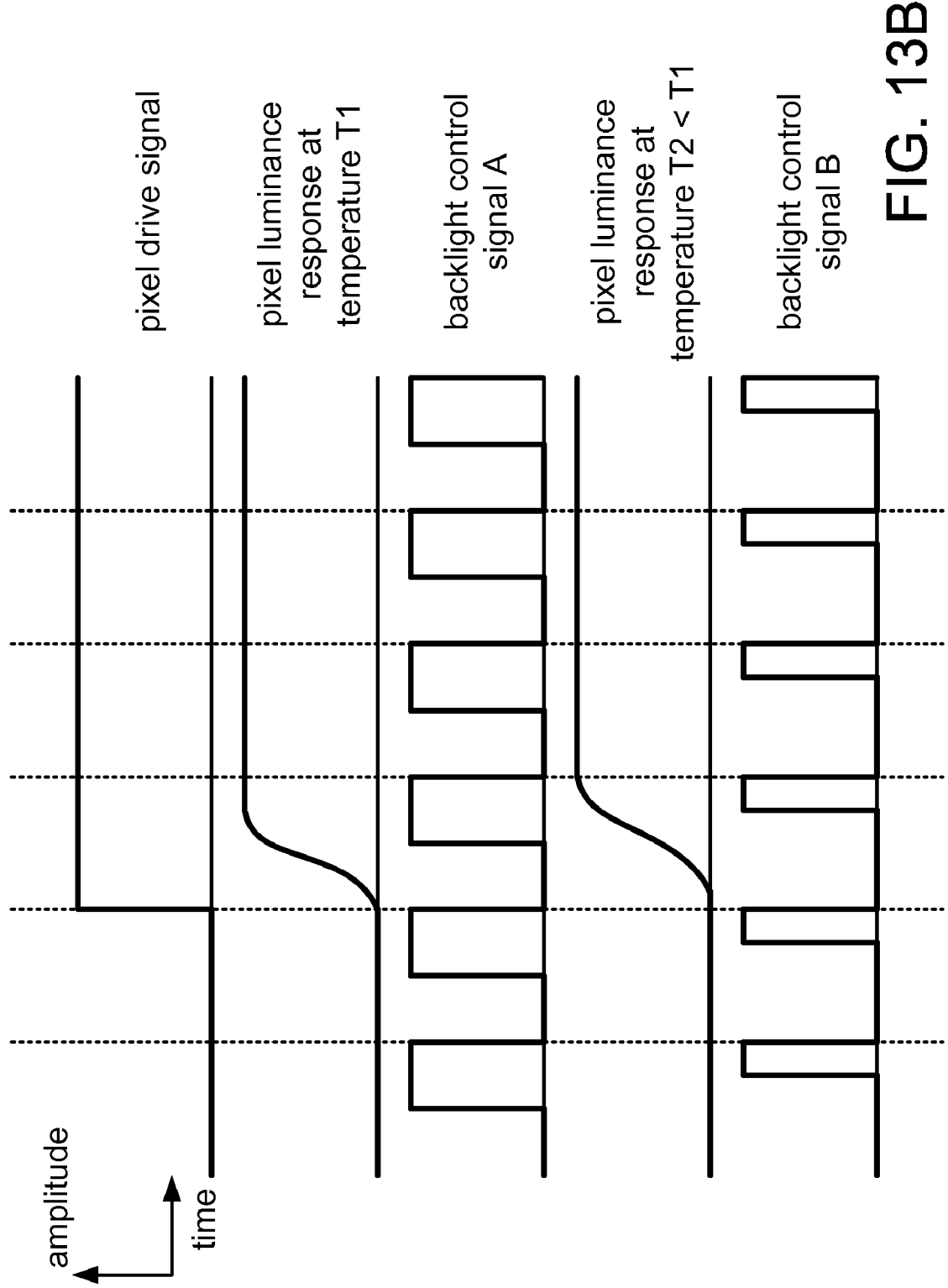
FIG. 13B shows a diagram of pixel luminance responses at different temperatures and corresponding backlight control signals in one blinking backlight scheme.

FIG. 13B shows examples of pixel luminance responses over time at two different temperatures T1 and T2 (where T2<T1) to a pixel drive signal having a transition from black to white. (The pixel would be expected to have luminance responses similar but not identical to the inverse of these plots for the opposite transition.) In order to minimize a perceptual difference between a pixel in transition and a pixel that is already stable, the duty cycle of the backlight may be controlled as shown in signals A and B. As illustrated in this figure, the pixel response time slows with decreasing temperature such that the backlight duty cycle must be reduced to achieve the same appearance of stability. Unfortunately, reducing the backlight duty cycle also decreases the brightness of the display.

LCD techniques to reduce the power consumption of the backlight include the use of color sequential backlights (also called "color field sequential backlights"), in which the various color fields are displayed separately, and the LEDs of the corresponding backlight colors are actuated separately, for each frame of a video signal to be displayed by the panel. Such a technique allows the use of LCD panels without color filters, and under ideal circumstances the power consumption of the backlight system as compared to a conventional display can be divided by three for a given light output. However, such a technique requires the LCD panel to operate at a frequency of, for example, three times the frame rate of an RGB video signal to be displayed (or four times the frame rate for a video signal to be displayed as RGBG). For example, to achieve a nominal video refresh rate of 60 Hz for an RGB signal, it may be desirable to drive the panel at a frame rate of 180 Hz. For the LCD panel to be successfully driven at such a high rate, the rise and fall times must be very low, requiring an LCD panel operating at a high temperature.

The thermal isolation provided by the thermal barriers of implementations of assemblies D10 and D25 as described herein allow for more efficient heating of LCD panel 50 than techniques currently known in the art. By thermally isolating LCD panel 50 from light sources 10, for example, such implementations may suffer less of the heat loss to the ambient environment that may occur in prior-art techniques where heating of the panel also causes heating of the light sources (with subsequent conduction of the heating energy to the external heat sink). Thus the isolating techniques described herein represent an enabling technology for applications of modulated light output of light sources 10. Such applications may include modulation of the driving signal of a light source 10 in synchronism with the driving signals of the LCD pixels. For example, such modulation may be implemented as pulse-width modulation (PWM) of the driving signal or signals of light sources 10 at a modulation frequency that is related to the frame rate (e.g., the frame rate may be an integer multiple of the modulation frequency). Such modulation may follow a fixed duty cycle or a variable duty cycle based on one or more factors such as temperature (e.g., as sensed by temperature sensors arranged as described herein) and/or signal content (e.g., fixed vs. moving image).

Figure 19:
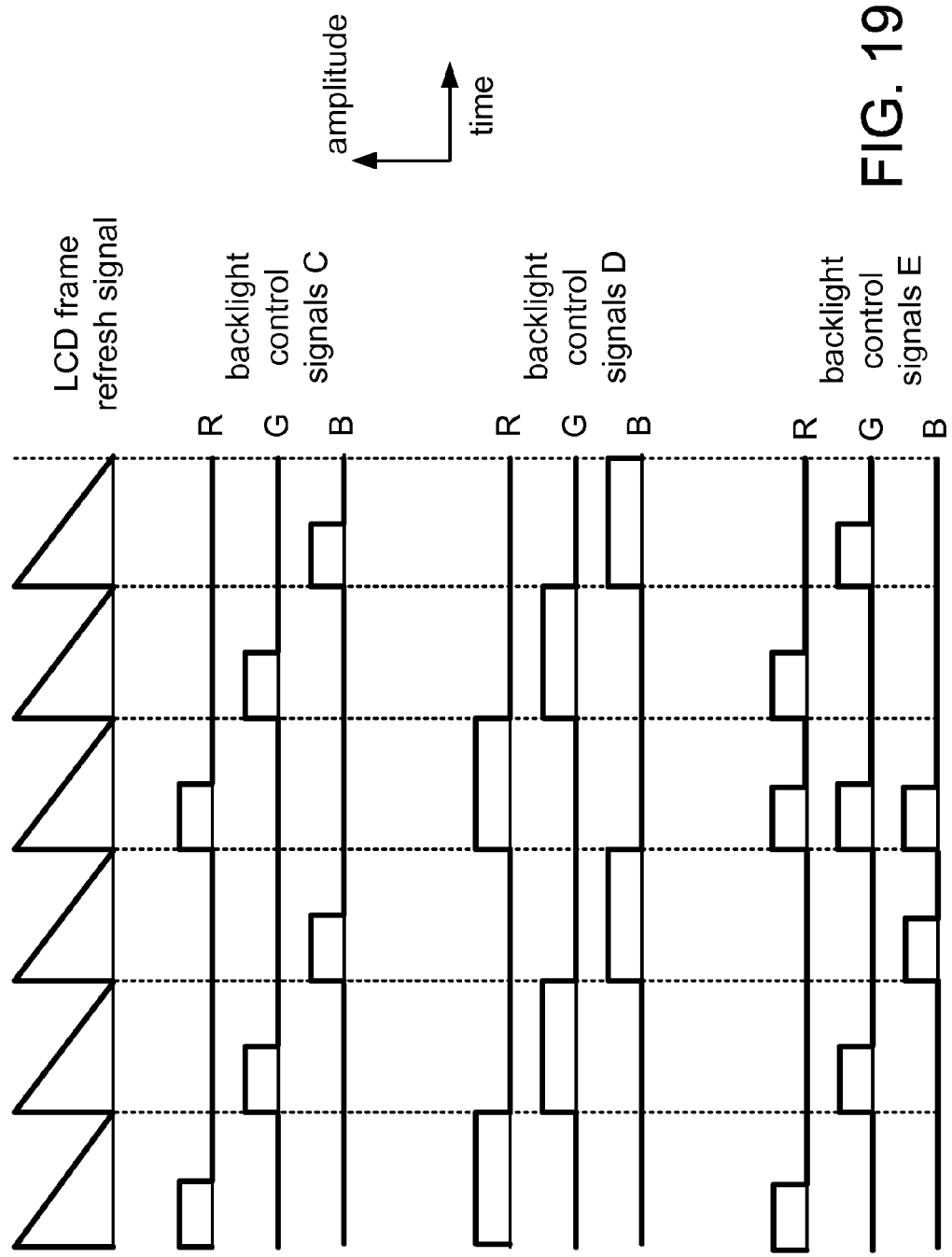
FIG. 19 shows examples of three different backlight modulation techniques.

FIG. 19 shows several examples of such modulation techniques. In a first example, backlight control signals C drive each of the red, green, and blue diode groups of light sources 10 at a modulation frequency that is one-third of the frame refresh rate of LCD panel 50 and at a duty cycle of one-sixth. In a second example, backlight control signals D drive each of the red, green, and blue diode groups of light sources 10 at a duty cycle of one-third. Any other duty cycle is possible, and different groups may be driven at different duty cycles (which may be fixed or variable). In each of these two examples, only one group is driven at a time. In a third example, backlight control signals E drive each of the red, green, and blue diode groups of light sources 10 at a modulation frequency that is one-fourth of the frame refresh rate of LCD panel 50, and during a part of each modulation cycle more than one group is driven at the same time. In further examples, different diode groups are driven at different modulation frequencies. Refinements to such modulation techniques as described elsewhere may also be applied, such as distributed frame addressing, different illumination phases for different colors, and adjusting relative duty cycles of the colors as the respective LEDs age and/or as their operating temperatures change.

It may be desired to configure a display assembly for use across a range of hot and cold ambient environments, and implementations of display assembly D10 that include combinations of any of the heating and active cooling arrangements presented herein are expressly contemplated and hereby disclosed. Such an implementation may include temperature sensors arranged to detect internal and ambient temperatures and a control system to control the active cooling and heating elements accordingly.

Glass has a thermal conductivity of about one watt per (meters times degrees Kelvin). Exposure of the large surface of LCD panel 50 (or of an optical stack including LCD panel 50) to the ambient environment may thus reduce the cooling efficiency when the ambient temperature is high. It may be even more problematic in practice that such exposure also tends to reduce the heating efficiency when the ambient temperature is low.

The range of embodiments includes a display assembly having a display panel, a chamber arranged to thermally isolate the panel from an ambient environment, a light source disposed outside the chamber, and a light guide configured to conduct light from the light source into the chamber and to distribute the light across a back surface of the panel. Such a display may include one or more active cooling elements configured to remove heat from the chamber. Alternatively or in addition to the active cooling elements, such a display may also include one or more heating elements configured to introduce heat into the chamber.

One embodiment may be described briefly as a display with an LCD panel which is located within a thermal isolation; and a light source outside the thermal isolation, the light being coupled in through holes in the thermal barrier; with the inside space of the thermal isolation being cooled and/or warmed up actively. Other arrangements that include the feature of the light guide passing through the thermal barrier are also contemplated.

Figure 14:
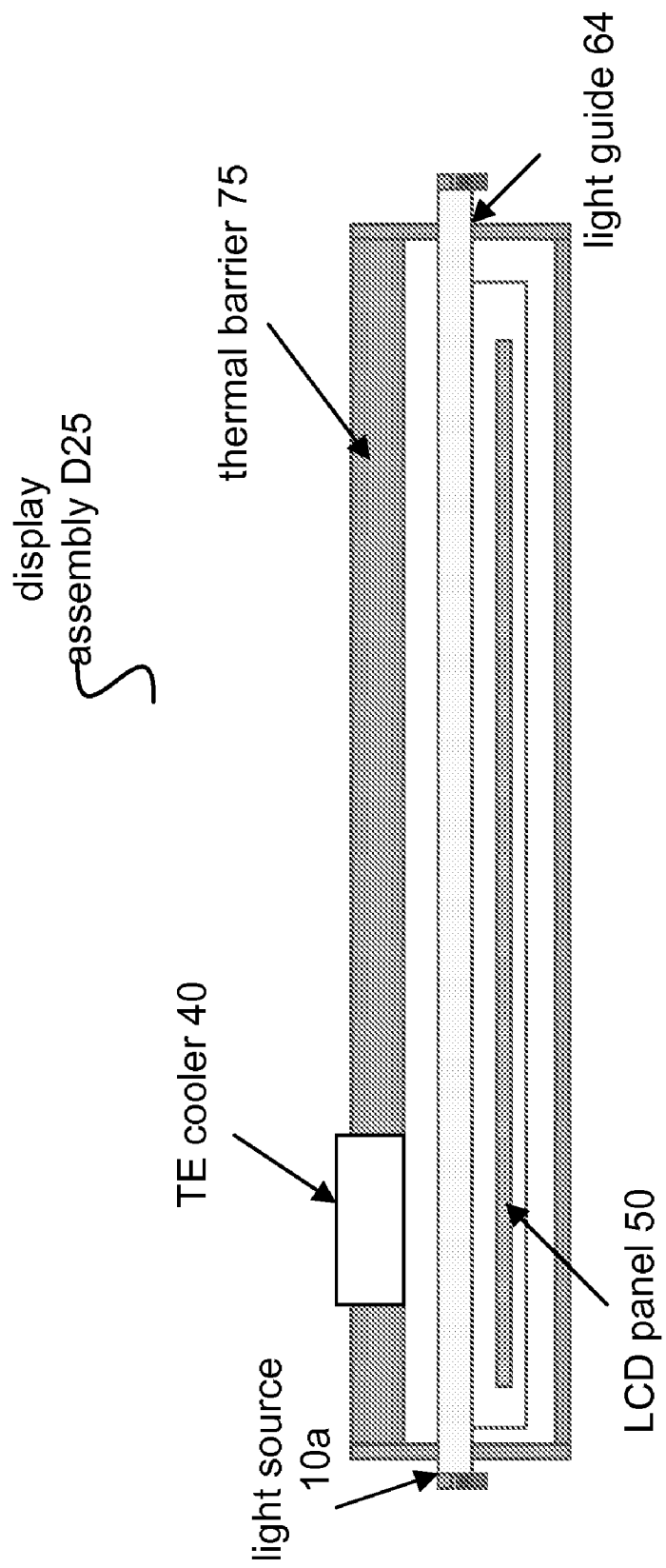
FIG. 14 shows a cross section of an implementation D25 of display assembly D10 in which LCD panel 50 is disposed within an insulating chamber.

FIG. 14 shows a block diagram of a display assembly D25 according to an embodiment. In assembly D25, an implementation 75 of thermal barrier 70 is extended to form a chamber enclosing LCD panel 50 and isolating it from an ambient environment.

The range of embodiments also includes a display assembly having a thermally isolated cavity or chamber, constructed using a thermal barrier (e.g., insulation), which is mounted around the LCD panel. The light source for the backlight is situated outside the thermally isolated chamber, such that the heat-generating parts inside the chamber are reduced to a minimum. The light from the light source of the backlight travels from outside and through the thermal barrier, enabling use of a transmissive technology for display. The inside of the thermally isolated chamber can be actively cooled or heated up with almost any cooling or heating technology that exists or is to be developed, and without needless losses. It may also be desired to provide a system for making the temperature uniform inside the chamber, again by any technology existing or to be developed, such as circulation of a heat transfer medium (e.g. air). Alternatively or in addition to such circulation, an implementation of heat diffuser 160 (e.g., a sheet of metal or another material with low thermal resistance) may be installed within the chamber to provide a uniform temperature distribution.

Thermal isolation (e.g., thermal barrier 75) is disposed to thermally insulate panel 50 from the ambient environment and/or from heat generated by light sources 10 and possibly from heat generated by other components of the assembly (such as a power supply and other circuitry). For example, the thermal isolation may form a thermally isolated chamber that encloses the display panel. The thermal isolation may include six walls arranged to enclose panel 50, with at least part of a front wall being transparent to allow viewing of panel 50. The sides or the back of the chamber contain openings to allow light to travel from outside into the inside of the cavity. The interior of the chamber enclosing panel 50 may have an atmosphere of air or another gas or other heat transfer medium. The thermal isolation (e.g., thermal barrier 75) may also include gaskets or other seals between the various walls or sections and/or may be molded to form the chamber or portion thereof. The transparent wall portion may be made of glass or a plastic such as PMMA. While a plastic may provide better thermal isolation, glass may be more resistant to scratching. For even better thermal isolation, the transparent portion may be constructed of layers of PMMA with air gaps between them.

Such an assembly may also include an implementation of thermal separator 90 (e.g., a thermal isolating ring) thermally separating the front part including the bezel (if made out of metal) and the back cover including the fins to cool the electronics. Embodiments of assembly D25 may also include one or more of the other features of implementations of assembly D10 as described herein, such as temperature sensors and control circuits, PCBs 110, and EMI shield 100.

It may be desirable to use a light guide that is longer than in the prior art, to provide more distance and thus more thermal isolation between the edge of the LCD panel and the light source. A light guide making angles of 90° may also be used. In other embodiments, a curtain backlight may be used (as shown in FIG. 1B, for example). In one such example, a number of LEDs (e.g., nine, ten, or sixteen) is distributed in a two-dimensional pattern behind thermal barrier 70, with a corresponding number of transport and receiving sections being arranged to pass through thermal barrier 70 and carry the light from each LED to the exit plate.

Such an assembly may include a structure to cool down the thermally isolated chamber (e.g., to remove heat from the interior of the chamber). In one embodiment, a number of TE coolers 40 (e.g., Peltier elements) are used to create a temperature difference between the chamber and the ambient environment. Additionally or alternatively to the cooling structure, the assembly may include a structure to heat up the contents of the thermally isolated chamber. In this embodiment, one or more heating elements (e.g., an implementation of heater 260 and/or an ITO layer) are used to create a temperature difference between the chamber and the ambient environment.

The range of embodiments includes an assembly having a panel enclosed within a chamber, at least one light source disposed outside the chamber, a rigid and/or hollow light pipe (e.g., an implementation of receiving and transport sections 60*a*, 60*b* as described herein) configured to conduct light from the light source into the chamber, and a light guide (e.g., an implementation of exit plate 60*c* as described herein) configured to distribute the light across a back surface of the panel. Other embodiments include a heat sink arranged within the chamber coupled to a heat exchanger arranged to conduct heat outside the chamber.

FIG. 15 shows a block diagram of an implementation D26 of display assembly D25. In this example, each light source 10 includes red, green, and blue LEDs, and light guide 62 is arranged in several sections. Light sources 10 are arranged along an edge of each of one or more sections 62a, each being an implementation of receiving and transport sections 60a, 60b as described herein. In one example, groups of red, blue, and green LEDs are arranged along the edge at a desired spacing (e.g. from one centimeter or less up to 10 centimeters). Sections 62a carry the light into the chamber via openings in the chamber wall. These sections are arranged to transfer the light to a section 62c (e.g., an implementation of exit plate 60c) that is configured to provide a desired distribution of the illumination across the back surface of panel 50.

In this example, sections 62a are arranged at an angle of 90 degrees to section 62c. It may be desirable for at least the surface of a section 62a that is opposite light source 10 (i.e., the end nearest to LCD panel 50) to be reflective to prevent light from escaping through such surface. In a case where colored LEDs are used to provide white light, it may also be desirable for sections 62a to be configured to perform mixing of the colored light. For example, such sections may be translucent or include reflective, diffusing, scattering, or distributing structures.

In this example, the chamber includes an implementation 270 of heat diffuser 160 that is configured as an internal heat sink configured to collect heat within the chamber. Heat sink 270 may be constructed of finned or ribbed sheet metal and may be blackened to increase heat absorption. For reduced weight, heat sink 270 may be made of aluminum or magnesium. Heat sink 270 may also be equipped with one or more fans 180 configured to circulate a heat transfer medium within the chamber. Heat sink 270 is thermally coupled (e.g. via one or more heat pipes, which may be made of copper) to one or more active cooling elements 40 that are configured to remove the collected heat from the chamber. In one example, an active cooling element 40 is a refrigeration unit including a compressor. In another example, a Peltier element is used as an active cooling unit 40. In some applications, active cooling is used to achieve a temperature differential of more than 10 degrees Celsius between the chamber and the external heat sink. The collected heat is conducted (e.g. via one or more heat pipes) into an external implementation 28 of heat sink 21 for dissipation into the ambient environment. Heat sink 28 and the isolated chamber are mounted to an implementation 84 of frame 80.

Embodiments may include one or more temperature sensors disposed within the thermally isolated chamber and a control circuit to activate one or more of the active cooling elements 40 and/or heating elements (e.g., heater 260 or a heating layer in the optical stack) according to a sensed temperature. For example, the control circuit may be configured to activate cooling when a preset temperature threshold (e.g., corresponding to a clearing temperature of the panel) is reached or exceeded. In embodiments that include heating of the panel and/or thermally isolated chamber, the control circuit may also be configured to activate heating when the sensed temperature reaches or falls below another preset temperature threshold.

Figure 16:
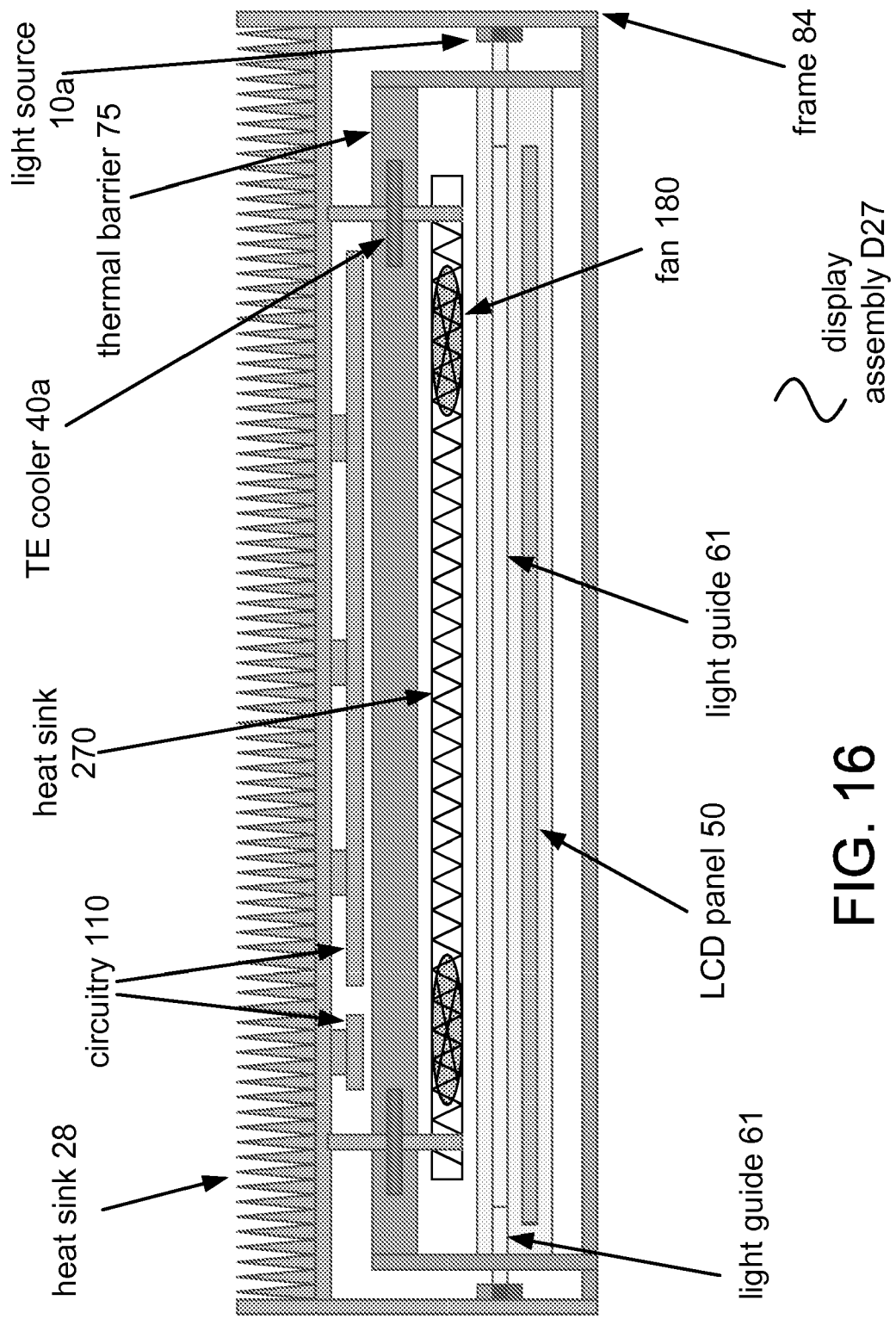
FIG. 16 shows a cross section of an implementation D27 of display assembly D25 having interior fans and a substantially planar light guide 61.

FIG. 16 shows a block diagram of an implementation D27 of display assembly D25. Assembly D27 includes an implementation of substantially planar light guide 61. In some embodiments, light guide 61 is constructed as a single piece.

Figure 17:
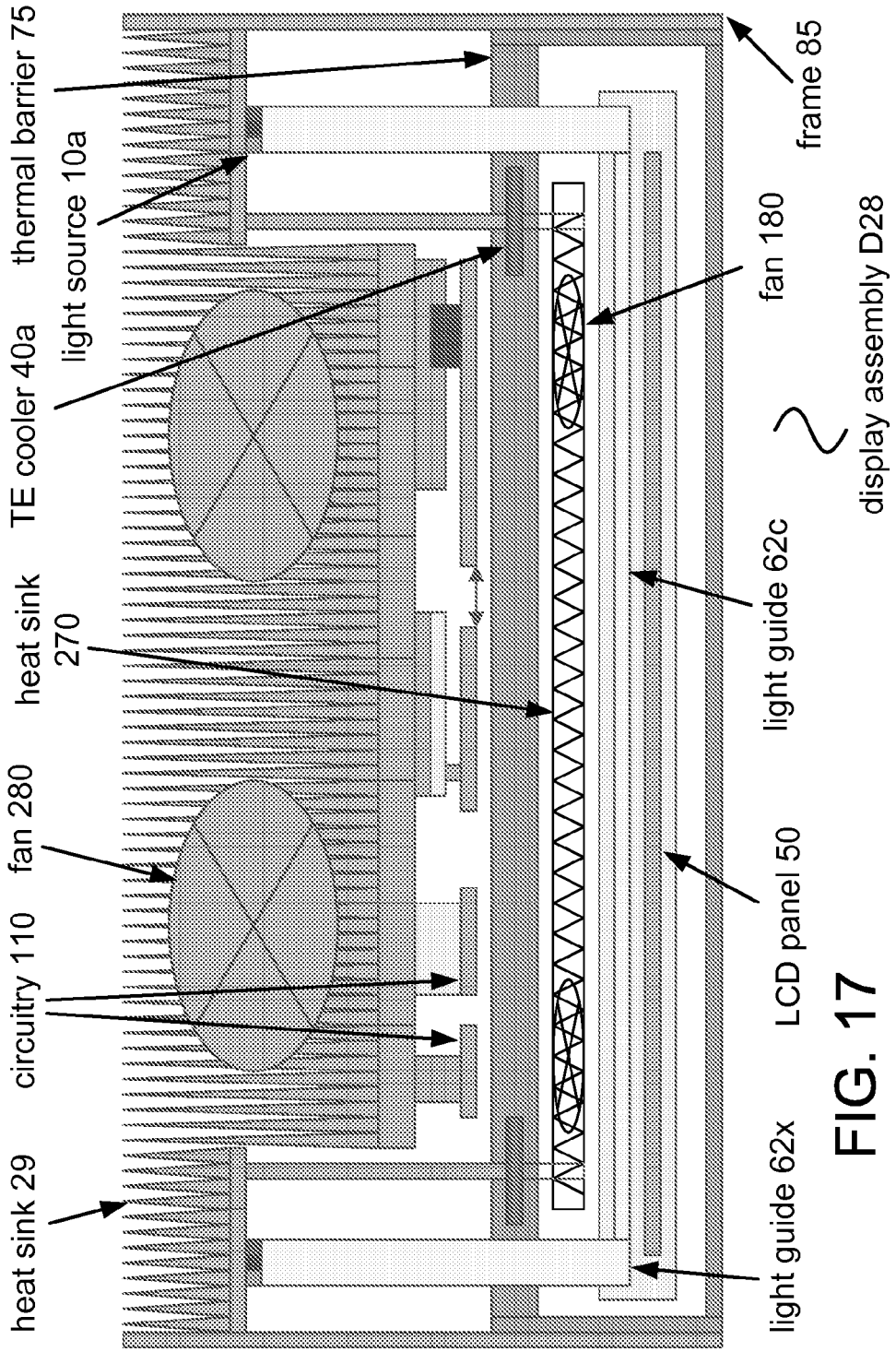
FIG. 17 shows a cross section of an implementation D28 of display assembly D26 having circuitry 110 that is thermally coupled to heat sink 29.
Figure 18:
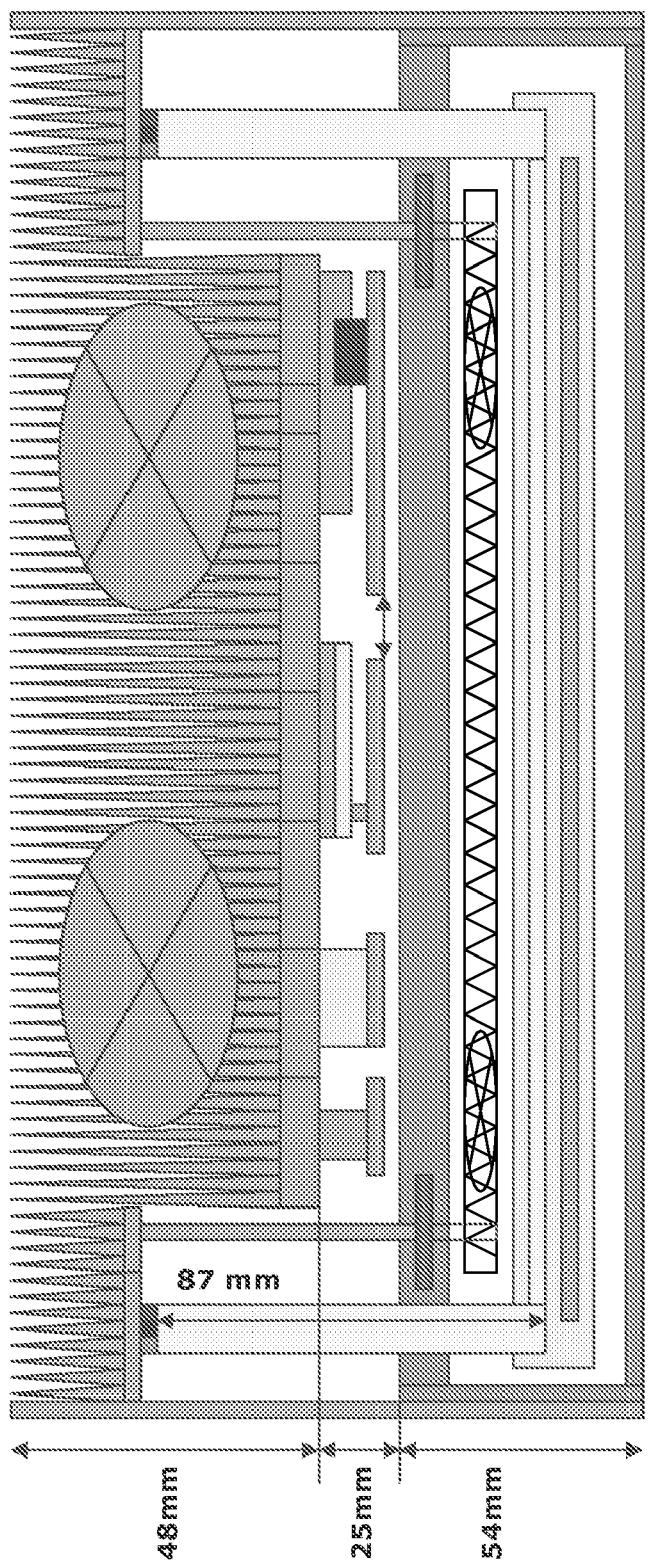
FIG. 18 indicates various dimensions in a cross section of one implementation of display assembly D28.

FIG. 17 shows a block diagram of an implementation D28 of display assembly D25. Light guides 62x are extended implementations of light guide 62a as described herein. Extension of a light guide 62a in this manner may provide increased thermal isolation between the panel 50 and respective light source 10. In this example, an extended implementation 29 of external heat sink 28 includes one or more fans 280 and is mounted to an extended implementation 85 of frame 84. FIG. 18 shows a diagram with examples of dimensions for a particular implementation of display assembly D28.

The range of embodiments includes applications of a new way of making an LCD display that can be used in both higher temperature and lower temperature environments. For example, embodiments may also be configured for use in low temperatures, such that heat is generated within the isolated chamber. In a low-ambient-temperature environment, it may be desired to heat an LCD panel to increase its luminance response time. A potential advantage of an embodiment in which the panel is disposed within a thermally isolated chamber is a reduced thermal capacitance, such that a desired heating of the panel may be achieved with less energy and, consequently, less heat dissipation to the ambient environment. Due to the lack of a low thermal resistance path between the LCD and the ambient, a heating element can be much more efficient, enabling the use of blinking or color sequential backlights instead of simply producing a somewhat acceptable panel performance at low ambient temperature.

For optimal heat transfer, a heating plate may be glued to the front of the LCD panel. To maintain thermal isolation, it may be desired to provide a gap between the heating plate and the transparent wall portion of the chamber.

The foregoing presentation of the described embodiments is provided to enable any person skilled in the art to make or use the present invention. Various modifications to these embodiments are possible, and the generic principles presented herein may be applied to other embodiments as well. Applications of display panels as described herein include avionic instrumentation display units, automatic teller machines, consumer dispenser machines (such as fuel pumps and beverage dispensers), and other situations in which extreme temperatures may be encountered. Other examples include applications in vehicles such as automobiles, helicopters, and armored vehicles, applications in environments where ambient temperatures are high relative to a clearing temperature of the panel, and applications in which self-heating of the display is problematic. Further embodiments include methods of image display using the components of a display assembly as described herein, and methods for actively cooling and/or heating a display panel using an assembly as described herein, which methods are expressly disclosed herein by descriptions of the operations of such assemblies. Thus, the scopes of the claims of this application are not intended to be limited to the embodiments shown above but rather are to be accorded the widest scope consistent with the principles and novel features disclosed in any fashion herein.

What is claimed is:

1. A display assembly comprising:
   a heat sink;
   a light source thermally coupled to said heat sink;
   a liquid crystal display panel arranged to transmit light produced by said light source;
   thermal insulation disposed to thermally insulate said liquid crystal display panel from heat generated by said light source; and
   an active cooling device arranged to actively transfer heat away from a side of said thermal insulation facing said liquid crystal display panel and to a side of said thermal insulation facing said heat sink.

2. The display assembly according to claim 1, wherein said thermal insulation is a substantially planar layer disposed to be substantially parallel to said liquid crystal display panel.

3. The display assembly according to claim 2, said assembly comprising a light guide,
wherein said light source is arranged to produce said produced light into an edge of said light guide, and
wherein said light guide includes a substantially planar plate arranged to distribute said produced light across a back surface of said liquid crystal display panel, and
wherein said plate is disposed between said liquid crystal display panel and said substantially planar layer.

4. The display assembly according to claim 1, said assembly comprising at least one fan arranged to circulate a heat transfer medium on a side of said thermal insulation facing away from said heat sink.

5. The display assembly according to claim 1, said assembly comprising a substantially planar thermal conductor disposed between said liquid crystal display panel and said thermal insulation and arranged to be substantially parallel to said liquid crystal display panel, wherein said thermal conductor has a thermal conductivity at least equal to eighty watts per (meters times degrees Kelvin).

6. The display assembly according to claim 5, wherein, within a plane between said liquid crystal display panel and said thermal insulation, said thermal conductor extends below a center of the liquid crystal display panel.

7. The display assembly according to claim 1, wherein said thermal insulation is configured to thermally insulate said liquid crystal display panel from an ambient environment of the display assembly, and
wherein a space is formed between a portion of said thermal insulation that extends across a front surface of said liquid crystal display panel and said front surface of said liquid crystal display panel.

8. The display assembly according to claim 1, wherein said thermal insulation extends across at least the front and back surfaces of said liquid crystal display panel such that a space is formed between a portion of said thermal insulation that extends across the front surface of said liquid crystal display panel and said front surface of said liquid crystal display panel.

9. The display assembly according to claim 1, said assembly comprising a heater located on a side of said thermal insulation facing said liquid crystal display panel.

10. The display assembly according to claim 9, said assembly comprising a substantially planar thermal conductor disposed between said liquid crystal display panel and said thermal barrier and arranged to be substantially parallel to said liquid crystal display panel, wherein said thermal conductor has a thermal conductivity at least equal to eighty watts per (meters times degrees Kelvin),
wherein said heater is disposed on said thermal conductor.

11. The display assembly according to claim 9, wherein said heater comprises a layer in an optical stack that includes said liquid crystal display panel.

12. The display assembly according to claim 1, wherein said active cooling device includes at least one among (A) a semiconductor thermoelectric device and (B) a refrigeration unit having a compressor and a heat exchanger.

13. The display assembly according to claim 1, wherein said active cooling device includes a Peltier device.

14. The display assembly according to claim 1, said assembly comprising a light guide,
wherein said light source is arranged to produce said produced light into an edge of said light guide, and
wherein said light guide includes a substantially planar plate arranged to distribute said produced light across a back surface of said liquid crystal display panel.

15. The display assembly according to claim 14, wherein said light guide includes a hollow structure, having a reflective interior wall, that is arranged to transport said produced light to an edge of said plate.

16. The display assembly according to claim 1, wherein said light source includes at least one among a light-emitting diode and a fluorescent lamp.

17. The display assembly according to claim 1, said assembly comprising:
a metallic bezel disposed to cover a perimeter of said liquid crystal display panel; and
a gasket arranged to thermally insulate said metallic bezel from heat generated by said light source.

18. The display assembly according to claim 1, wherein said light source includes at least one light-emitting diode,
said assembly comprising a control circuit configured to modulate a light output of said light-emitting diode at a modulation frequency of 1/n times a frame rate of said liquid crystal display panel, wherein n is an integer greater than zero.

19. The display assembly according to claim 1, wherein said thermal insulation comprises a layer, made of at least one among fiber and foam, that is disposed to thermally insulate said liquid crystal display panel from heat generated by said light source.

20. The display assembly according to claim 1, wherein said light source is disposed on said side of said thermal insulation that faces said heat sink.

21. The display assembly according to claim 1, wherein said active cooling device is arranged to actively transfer heat generated by said light source away from a side of said thermal insulation facing said liquid crystal display panel and to a side of said thermal insulation facing said heat sink.

22. A display assembly comprising:
a thermal barrier;
a heat sink located on a first side of said thermal barrier;
a light source thermally coupled to said heat sink;
a liquid crystal display panel (A) located on a second side of said thermal barrier opposite the first side and (B) arranged to transmit light produced by said light source; and
an active cooling device arranged to actively transfer heat from the second side of said thermal barrier to the first side of said thermal barrier,
wherein said thermal barrier includes a substantially planar layer disposed to be substantially parallel to said liquid crystal display panel.

23. The display assembly according to claim 22, said assembly comprising a heater located on the second side of said thermal barrier.

24. The display assembly according to claim 23, said assembly comprising a substantially planar thermal conductor disposed between said liquid crystal display panel and said thermal barrier and arranged to be substantially parallel to said liquid crystal display panel, wherein said thermal conductor has a thermal conductivity at least equal to eighty watts per (meters times degrees Kelvin),
wherein said heater is disposed on said thermal conductor.

25. The display assembly according to claim 23, wherein said heater comprises a layer in an optical stack that includes said liquid crystal display panel.

26. The display assembly according to claim 22, said assembly comprising at least one fan arranged to circulate a heat transfer medium on a side of said thermal barrier facing away from said heat sink.

27. The display assembly according to claim 22, said assembly comprising a substantially planar thermal conductor disposed between said liquid crystal display panel and said thermal barrier and arranged to be substantially parallel to said liquid crystal display panel, wherein said thermal conductor has a thermal conductivity at least equal to eighty watts per (meters times degrees Kelvin).

28. The display assembly according to claim 27, wherein, within a plane between said liquid crystal display panel and said thermal barrier, said thermal conductor extends below a center of said liquid crystal display panel.

29. The display assembly according to claim 22, wherein said thermal barrier is configured to thermally insulate said liquid crystal display panel from an ambient environment of the display assembly, and
 wherein a space is formed between a portion of said thermal barrier that extends across a front surface of said liquid crystal display panel and said front surface of said liquid crystal display panel.

30. The display assembly according to claim 22, wherein said thermal barrier extends across at least the front and back surfaces of said liquid crystal display panel such that a space is formed between a portion of said thermal barrier that extends across the front surface of said liquid crystal display panel and said front surface of said liquid crystal display panel.

31. The display assembly according to claim 22, wherein said active cooling device includes at least one among (A) a semiconductor thermoelectric device and (B) a refrigeration unit having a compressor and a heat exchanger.

32. The display assembly according to claim 22, wherein said active cooling device includes a Peltier device.

33. The display assembly according to claim 22, said assembly comprising a light guide,
 wherein said light source is arranged to produce said produced light into an edge of said light guide, and
 wherein said light guide includes a substantially planar plate arranged to distribute said produced light across a back surface of said liquid crystal display panel.

34. The display assembly according to claim 33, wherein said light guide includes a hollow structure, having a reflective interior wall, that is arranged to transport said produced light to an edge of said plate.

35. The display assembly according to claim 22, wherein said light source includes at least one among a light-emitting diode and a fluorescent lamp.

36. The display assembly according to claim 22, said assembly comprising:
 a metallic bezel disposed to cover a perimeter of said liquid crystal display panel; and
 a gasket arranged to thermally insulate said metallic bezel from heat generated by said light source.

37. The display assembly according to claim 22, wherein said light source includes at least one light-emitting diode,
 said assembly comprising a control circuit configured to modulate a light output of said light-emitting diode at a modulation frequency of 1/n times a frame rate of said liquid crystal display panel, wherein n is an integer greater than zero.

38. The display assembly according to claim 22, wherein said substantially planar layer is made of at least one among fiber and foam.

39. The display assembly according to claim 22, wherein said heat sink is located on a first side of said substantially planar layer, and
 wherein said liquid crystal display panel is located on a second side of said substantially planar layer opposite the first side, and
 wherein said active cooling device is arranged to actively transfer heat from the second side of said substantially planar layer to the first side of said substantially planar layer.

40. The display assembly according to claim 39, said assembly comprising a light guide,
 wherein said light source is arranged to produce said produced light into an edge of said light guide, and
 wherein said light guide includes a substantially planar plate arranged to distribute said produced light across a back surface of said liquid crystal display panel, and
 wherein said plate is disposed between said liquid crystal display panel and said substantially planar layer.

41. The display assembly according to claim 22, wherein said light source is disposed on said first side of said thermal barrier.

42. The display assembly according to claim 22, wherein said active cooling device is arranged to actively transfer heat generated by said light source from the second side of said thermal barrier to the first side of said thermal barrier.

43. A display assembly comprising:
 a light source;
 a liquid crystal display panel;
 means for thermally insulating said liquid crystal display panel from heat generated by said light source;
 means for transporting light produced by said light source from a first side of said means for thermally insulating to a second side of said means for thermally insulating;
 on the second side of said means for thermally insulating, means for directing the transported light through said liquid crystal display panel; and
 means for actively transporting heat energy from a cooler side of said means for thermally insulating to a warmer side of said means for thermally insulating.

44. The display assembly according to claim 43, wherein said light source includes at least one among a light-emitting diode and a fluorescent lamp.

45. The display assembly according to claim 43, said assembly comprising:
 a metallic bezel disposed to cover a perimeter of said liquid crystal display panel; and
 a gasket arranged to thermally insulate said metallic bezel from heat generated by said light source.

46. The display assembly according to claim 43, wherein said light source includes at least one light-emitting diode,
 said assembly comprising a control circuit configured to modulate a light output of said light-emitting diode at a modulation frequency of 1/n times a frame rate of said liquid crystal display panel, wherein n is an integer greater than zero.

47. The display assembly according to claim 43, wherein said means for thermally insulating comprises a layer, made of at least one among fiber and foam, that is disposed to thermally insulate said liquid crystal display panel from heat generated by said light source.

48. The display assembly according to claim 43, wherein said means for actively transporting heat energy from the cooler side of said means for thermally insulating to the warmer side of said means for thermally insulating includes at least one among (A) a semiconductor thermoelectric device and (B) a refrigeration unit having a compressor and a heat exchanger.

49. The display assembly according to claim 43, wherein said assembly includes a substantially planar thermal conductor arranged to be substantially parallel to said liquid crystal display panel,
   wherein said thermal conductor has a thermal conductivity at least equal to eighty watts per (meters times degrees Kelvin), and
   wherein, within a plane between said liquid crystal display panel and said means for thermally insulating, said thermal conductor extends below a center of said liquid crystal display panel.

50. The display assembly according to claim 43, wherein said light source is arranged to produce said light into an edge of said means for transporting light, and
   wherein said means for directing the transported light includes a substantially planar plate arranged to distribute said produced light across a back surface of said liquid crystal display panel.

51. A method of image display, said method comprising:
   operating a light source to produce light, where the light source is thermally coupled to a heat sink;
   transporting the produced light from a first side of a thermal barrier to a second side of the thermal barrier opposite to the first side;
   on the second side of the thermal barrier, directing the transported light through a liquid crystal display panel; and
   during said operating a light source, using at least one active cooling device to actively transport heat from the second side of the thermal barrier to the first side.

52. The method of image display according to claim 51, wherein said transporting the produced light includes transporting the produced light from a first side of a layer of the thermal barrier to a second side of the layer opposite to the first side of the layer, wherein the layer is made of at least one among fiber and foam.

53. The display assembly according to claim 51, wherein said using at least one active cooling device comprises using the at least one active cooling device to actively transport heat generated by said light source from the second side of the thermal barrier to the first side.

54. The method according to claim 51, wherein said method includes using a substantially planar thermal conductor to distribute heat in a plane between said liquid crystal display panel and said thermal barrier,
   wherein said conductor has a thermal conductivity at least equal to eighty watts per (meters times degrees Kelvin) and is arranged to be substantially parallel to said liquid crystal display panel,
   wherein, within said plane, said thermal conductor extends below a center of said liquid crystal display panel.

55. The method according to claim 51, wherein said light source is arranged to produce said light into an edge of a means for said transporting the produced light, and
   wherein directing the transported light includes using a substantially planar plate to distribute said produced light across a back surface of said liquid crystal display panel.

* * * * *